(12) United States Patent
Nagaoka

(10) Patent No.: US 10,498,220 B2
(45) Date of Patent: Dec. 3, 2019

(54) POWER TRANSMITTER AND WIRELESS POWER TRANSFER SYSTEM

(71) Applicant: IHI CORPORATION, Tokyo (JP)

(72) Inventor: Shiro Nagaoka, Tokyo (JP)

(73) Assignee: IHI CORPORATION, Tokyo (JP)

(*) Notice: Subject to any disclaimer, the term of this patent is extended or adjusted under 35 U.S.C. 154(b) by 109 days.

(21) Appl. No.: 15/752,117

(22) PCT Filed: Sep. 6, 2016

(86) PCT No.: PCT/JP2016/076187
§ 371 (c)(1),
(2) Date: Feb. 12, 2018

(87) PCT Pub. No.: WO2017/047455
PCT Pub. Date: Mar. 23, 2017

(65) Prior Publication Data
US 2018/0241301 A1    Aug. 23, 2018

(30) Foreign Application Priority Data

Sep. 17, 2015 (JP) ................ 2015-183900
Mar. 22, 2016 (JP) ................ 2016-056611

(51) Int. Cl.
*H02M 1/14* (2006.01)
*H02J 50/10* (2016.01)
*H02J 7/02* (2016.01)
(Continued)

(52) U.S. Cl.
CPC ............ *H02M 1/14* (2013.01); *H02J 7/025* (2013.01); *H02J 50/10* (2016.02); *H02J 50/80* (2016.02);
(Continued)

(58) Field of Classification Search
CPC .......... H02M 1/14; H02M 7/537; H02J 50/10; H02J 50/80; H02J 7/025; B60L 2210/40
(Continued)

(56) References Cited

U.S. PATENT DOCUMENTS

2011/0231029 A1  9/2011  Ichikawa
2013/0188397 A1  7/2013  Wu
(Continued)

FOREIGN PATENT DOCUMENTS

EP    2827486 A1    1/2015
JP    07-264870 A   10/1995
(Continued)

OTHER PUBLICATIONS

International Search Report mailed in corresponding International Patent Application No. PCT/JP2016/076187 dated Dec. 6, 2016, consisting of 5 pp. (English Translation Provided).
(Continued)

*Primary Examiner* — Hal Kaplan
(74) *Attorney, Agent, or Firm* — Volpe and Koenig, P.C.

(57) ABSTRACT

A power transmitter according to one aspect of the disclosure includes: a power converter that converts a first AC power supplied from an AC power source into a DC power; a first detector that detects an electric current of the DC power; a feedback signal generator that generates a feedback signal based on the electric current of the DC power; and a controller that performs a feedback control on the electric power supplied to a power receiver based on the feedback signal. The feedback signal generator generates a canceling waveform to reduce a ripple caused to the DC power due to zero crossing of a voltage of the first AC power and generates the feedback signal based on the electric current of the DC power and the canceling waveform.

14 Claims, 17 Drawing Sheets

(51) Int. Cl.
*H02M 7/537* (2006.01)
*H02J 50/80* (2016.01)
(52) U.S. Cl.
CPC .......... *B60L 2210/40* (2013.01); *H02M 7/537* (2013.01)
(58) Field of Classification Search
USPC ........................................................ 307/104
See application file for complete search history.

(56) References Cited

U.S. PATENT DOCUMENTS

| | | |
|---|---|---|
| 2013/0207468 A1 | 8/2013 | Wu |
| 2013/0207601 A1 | 8/2013 | Wu |
| 2013/0293192 A1 | 11/2013 | Abe |
| 2014/0354073 A1 | 12/2014 | Sadakata |
| 2014/0354074 A1 | 12/2014 | Sadakata |
| 2015/0145446 A1 | 5/2015 | Shitabo |

FOREIGN PATENT DOCUMENTS

| | | |
|---|---|---|
| JP | 2000-102290 A | 4/2000 |
| JP | 2004-260871 A | 9/2004 |
| JP | 2010-057254 A | 3/2010 |
| JP | 2010-154696 A | 7/2010 |
| JP | 2012-152041 A | 8/2012 |
| JP | 2013-115961 A | 6/2013 |
| JP | 2013-247687 A | 12/2013 |
| JP | 2014-072966 A | 4/2014 |
| JP | 2014-117017 A | 6/2014 |
| JP | 2015-033316 A | 2/2015 |
| JP | 2015-511479 A | 4/2015 |
| JP | 2015-089221 A | 5/2015 |
| JP | 2015-104178 A | 6/2015 |
| WO | 2010/035321 A1 | 4/2010 |
| WO | 2012/093423 A1 | 7/2012 |
| WO | 2013/136753 A1 | 9/2013 |
| WO | 2013/136755 A1 | 9/2013 |
| WO | 2014/088708 A1 | 6/2014 |

OTHER PUBLICATIONS

Jackson D K et al, "Feedforward ripple cancellation for a full-bridge converter", Applied Power Electronics Conference and Exposition, 2000.APEC 2000.Fifteenth Annual IEEE, IEEE, vol. 1, Feb. 6, 2000, p. 347-p. 352, XP010371714.

Fig.15
(a)
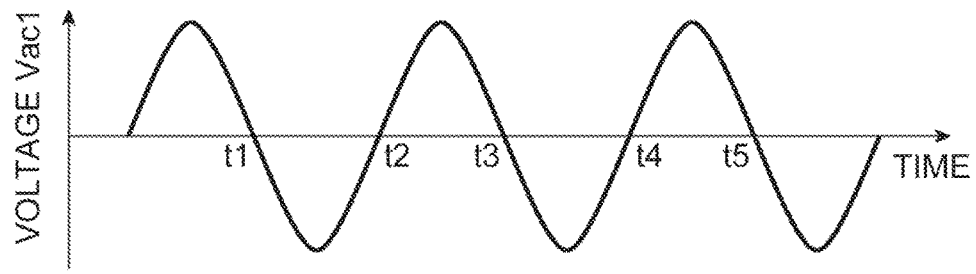
(b)
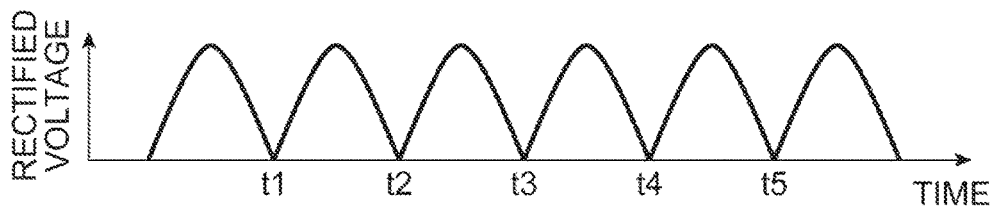
(c)
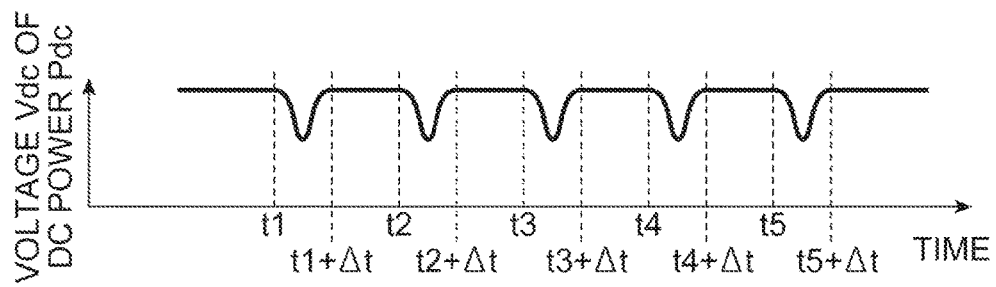
(d)
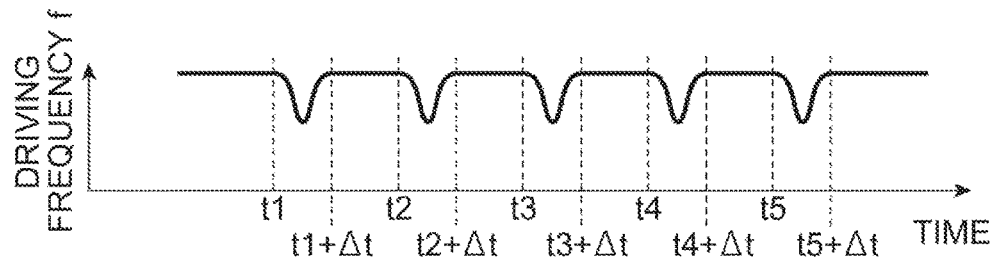

*Fig.16*
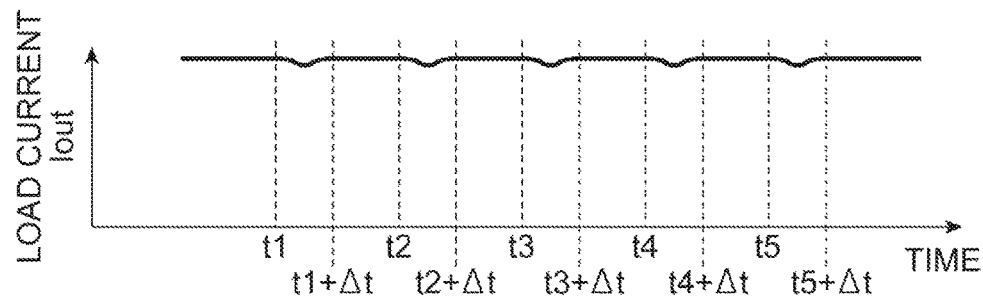
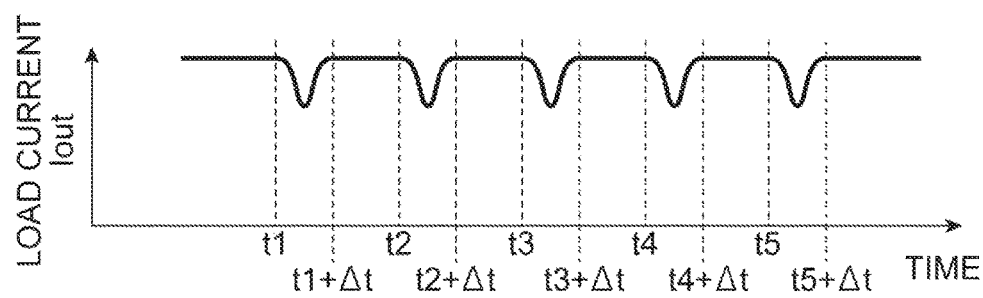

POWER TRANSMITTER AND WIRELESS POWER TRANSFER SYSTEM

TECHNICAL FIELD

The disclosure relates to a power transmitter and a wireless power transfer system. The present application is based on Japanese Patent Application No. 2015-183900 filed on Sep. 17, 2015 and on Japanese Patent Application No. 2016-056611 filed on Mar. 22, 2016 and claims the benefit of priority thereto. The entire contents of these applications are incorporated herein by reference.

BACKGROUND ART

There has been known a wireless power transfer system that wirelessly transmits electric power. The wireless power transfer system is provided with a power transmitter including a power transmission coil, and a power receiver including a power reception coil, and the system achieves wireless power transmission using electromagnetic induction, magnetic resonance, or the like between the coils. The wireless power transfer system is applicable to, for example, a charging system of an electric vehicle. In this case, the electric power that is wirelessly transmitted is supplied to a battery.

To the battery, it is necessary to supply a direct current (DC) signal. In signal conversion and signal processing in the wireless power transfer system, however, a ripple (fluctuation) may be caused to the DC signal. It is desired that such ripple be removed. In Patent Literature 1, for example, there is described a technique for reducing the ripple caused to the electric power received by the power reception coil by controlling a voltage of the power transmission coil. In the technique described in Patent Literature 1, in order to suppress strength of an electromagnetic field generated around the power transmission and reception coils, the ripple, which is caused by spreading a frequency of the electric power supplied to the power transmission coil, is to be removed.

As described in Patent Literature 2, as a control of the electric power transmitted in the wireless power transfer system, there has also been known a combination of a first feedback control (feedback control based on a first characteristic value) and a command value correction control (correction feedback control based on a second characteristic value).

CITATION LIST

Patent Literature

Patent Literature 1: Japanese Unexamined Patent Publication No. 2015-33316
Patent Literature 2: Japanese Unexamined Patent Publication No. 2015-89221

SUMMARY

Technical Problem

The power transmitter may generate a high-frequency alternating current (AC) power to be supplied to the power transmission coil from an AC power of a commercial system and the like. In this case, in the power transmitter, full-wave rectification is performed on an AC voltage, and by boosting the full-wave rectified voltage, a DC voltage is generated. However, since the voltage is difficult to be boosted near a zero crossing point of the AC voltage, the DC voltage is temporarily decreased, and there is a possibility that a ripple is caused to the DC voltage. By the ripple being caused to the DC voltage, a direct current (DC signal) supplied to a load is temporarily decreased, and the ripple may also be caused to the direct current (DC signal) that is supplied to the load.

The disclosure describes a power transmitter and a wireless power transfer system capable of reducing a ripple caused to a load current due to zero crossing of a voltage of an AC power.

Solution to Problem

The power transmitter according to one aspect of the disclosure is a device that wirelessly supplies electric power to a power receiver. The power transmitter includes: a power converter configured to convert a first AC power supplied from an AC power source into a DC power; a first detector configured to detect an electric current of the DC power; a feedback signal generator configured to generate a feedback signal based on the electric current; and a controller configured to perform a feedback control on the electric power to be supplied to the power receiver based on the feedback signal. The feedback signal generator generates a canceling waveform for reducing a ripple caused to the electric current due to zero crossing of a voltage of the first AC power and generates the feedback signal based on the electric current and the canceling waveform.

Advantageous Effects

According to the disclosure, it is possible to reduce the ripple caused to the load current due to the zero crossing of the voltage of the AC power.

BRIEF DESCRIPTION OF DRAWINGS

FIG. 15 is a graph for explaining operation of the wireless power transfer system of FIG. 12.

FIG. 16 is a graph for explaining the operation of the wireless power transfer system of FIG. 12.

DESCRIPTION OF EMBODIMENTS

[1] Outline of Embodiments

Figure 1:
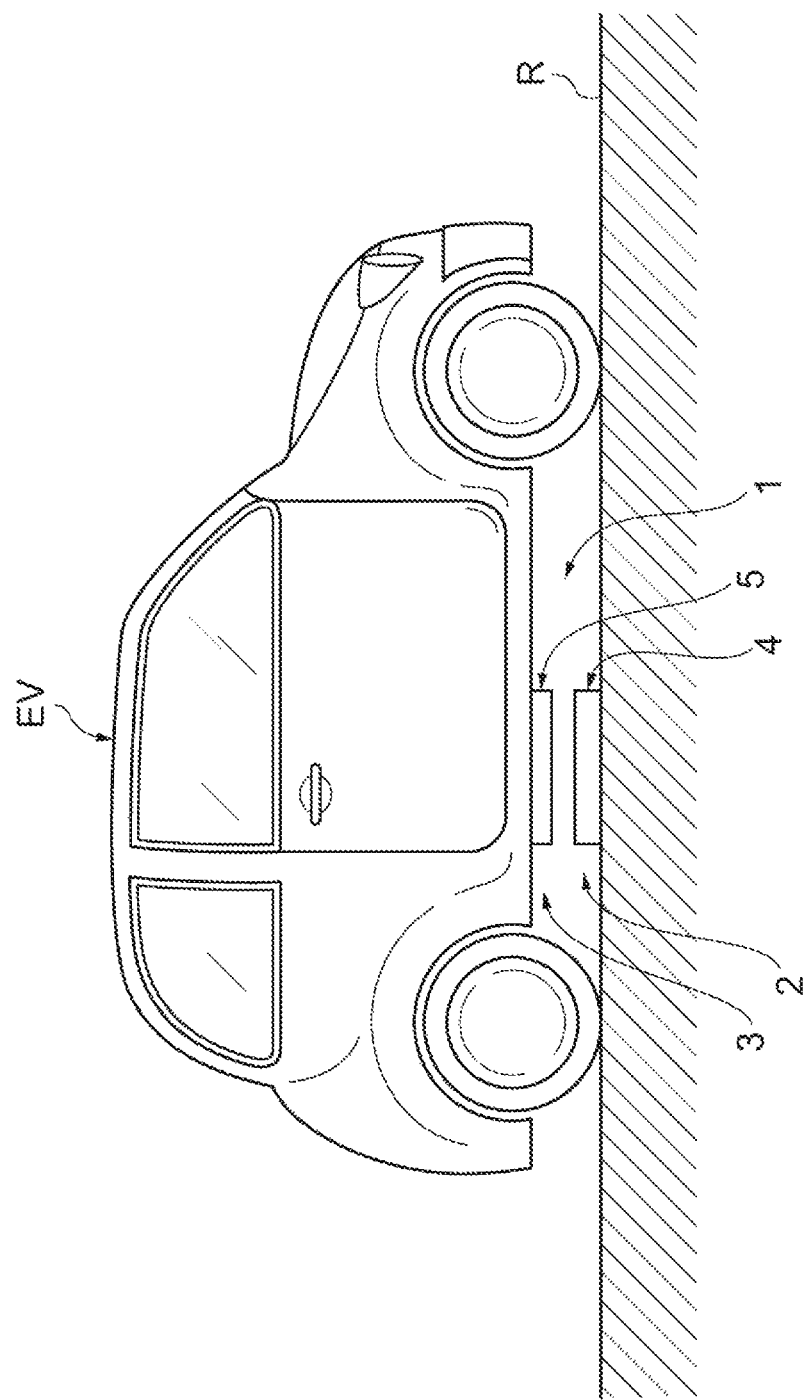
FIG. 1 is a view illustrating an application example of a power transmitter and a wireless power transfer system according to an embodiment.

A power transmitter according to one aspect of the disclosure is a device that wirelessly supplies electric power to a power receiver. The power transmitter includes: a power converter configured to convert a first AC power supplied from an AC power source into a DC power; a first detector configured to detect an electric current of the DC power; a feedback signal generator configured to generate a feedback signal based on the electric current; and a controller configured to perform a feedback control on the electric power to be supplied to the power receiver based on the feedback signal. The feedback signal generator generates a canceling waveform for reducing a ripple caused to the electric current due to zero crossing of a voltage of the first AC power and generates the feedback signal based on the electric current and the canceling waveform.

In the power transmitter, the first AC power is converted into the DC power by the power converter. To the electric current of the DC power, the ripple may be caused due to the zero crossing of the voltage of the first AC power. In the power transmitter, the electric current of the DC power is detected, the canceling waveform for reducing the ripple of the electric current of the DC power is generated, and the feedback signal is generated based on the detected electric current and the canceling waveform. For this reason, it is possible to reduce the ripple of the feedback signal. Then, based on the feedback signal in which the ripple has been reduced, the feedback control is performed on the electric power to be supplied to the power receiver. Accordingly, a variation in the electric power to be supplied to the power receiver accompanying a change in the electric current of the DC power is eliminated, whereby it is possible to stabilize a current amount of a load current to be supplied to a load. As a result, it is possible to reduce the ripple caused to the load current due to the zero crossing of the voltage of the AC power.

The feedback signal generator may generate the canceling waveform by inverting the electric current. In this case, it is possible to simplify a process for generating the canceling waveform.

The feedback signal generator may also generate the canceling waveform based on the first AC power. In this case, it is possible to reduce the ripple of the detected electric current of the DC power without affecting a frequency component such as a gap variation and a transient response.

The feedback signal generator may include: a first generating unit configured to generate a canceling waveform by inverting the electric current; a second generating unit configured to generate a canceling waveform based on the first AC power; and a selecting unit configured to select and output either the canceling waveform generated by the first generating unit or the canceling waveform generated by the second generating unit. In this case, it is possible to select a method for generating the canceling waveform.

The feedback signal generator may correct the canceling waveform based on a correction waveform corresponding to the ripple caused to a voltage of the DC power due to the zero crossing. To the voltage of the DC power, the ripple due to the zero crossing of the voltage of the first AC power may occur. Due to this ripple, a ripple is caused to the electric power to be supplied to the power receiver, and further a ripple is caused to the load current as well. To deal with this, by the correction waveform corresponding to the ripple caused to the voltage of the DC power, the canceling waveform is corrected, and the feedback signal is generated. Based on the feedback signal, the feedback control is performed on the electric power to be supplied to the power receiver, whereby it is possible to reduce the ripple of the electric power to be supplied to the power receiver. As a result, it is possible to further reduce the ripple caused to the load current due to the zero crossing of the voltage of the first AC power.

The power transmitter described above may further include a first communication device configured to receive ripple information on the ripple of a load voltage, the load current, or a load power that is supplied to the load from the power receiver. The feedback signal generator may correct the canceling waveform based on the ripple information. In this case, the canceling waveform is corrected based on the ripple information on the ripple of the load voltage, the load current, or the load power that is supplied to the load. In this way, since the canceling waveform can be corrected according to the ripple of the load voltage, the load current, or the load power that is actually supplied to the load, it is possible to surely reduce the ripple caused to the load current due to the zero crossing of the voltage of the first AC power.

A wireless power transfer system according to another aspect of the disclosure includes the above-described power transmitter and the power receiver. The power receiver includes: a second detector configured to detect the load, voltage, the load current, or the load power; a second controller configured to generate the ripple information based on the load voltage, the load current, or the load power measured by the second detector; and a second communication device configured to transmit the ripple information to the power transmitter.

In the wireless power transfer system as well, it is possible to stabilize the feedback control and to stabilize the current amount of the load current that is supplied to the load. Further, in the wireless power transfer system, the canceling waveform is corrected based on the ripple information on the ripple of the load voltage, the load current, or the load power that is supplied to the load. In this way, since the canceling waveform can be corrected according to the ripple of, the load voltage, the load current, or the load power that is actually supplied to the load, it is possible to surely reduce the ripple caused to the load current due to the zero crossing of the voltage of the first AC power.

The power transmitter according to one aspect of the disclosure includes: a coil for wirelessly feeding power to the power receiver; a converter configured to convert the first AC power supplied from the AC power source into a second AC power and to supply the second AC power to the coil; and a first controller configured to control the converter such that a magnitude of the second AC power is changed based on a zero crossing timing of the voltage of first AC power.

In the power transmitter, the converter is controlled such that the magnitude of the second AC power, which is obtained by converting the first AC power, is changed based on the zero crossing timing of the voltage of the first AC power. As the magnitude of the second AC power is increased, a magnitude of the load power that is supplied to the load in the power receiver is also increased, whereby the current amount of the load current that is supplied to the load may also be increased. On the other hand, as the magnitude of the second AC power is decreased, the magnitude of the load power that is supplied to the load in the power receiver is also decreased, whereby the current amount of the load current that is supplied to the load may also be decreased. For this reason, even when the current amount of the load current temporarily fluctuates (increases or decreases) due to the zero crossing of the voltage of the first AC power, the current amount of the load current may be changed (increased or decreased) based on the zero crossing timing of the voltage of the first AC power, whereby it is possible to reduce the ripple due to the zero crossing of the voltage of the first AC power.

The converter may include: a power converter configured to convert the first AC power into the DC power; and a DC/AC converter configured to convert the DC power into the second AC power. In this case, the first AC power is once converted into the DC power, and then the DC power is converted into the second AC power.

The first controller may control the converter such that the magnitude of the second AC power is changed by changing a frequency of the second AC power. In a case where an impedance when the coil is viewed from the converter exhibits inductivity, by decreasing the frequency of the second AC power, it is possible to increase the magnitude of the second AC power, whereby it is possible to increase the magnitude of the load power (current amount of the load current) that is supplied to the load from the power receiver. Similarly, by increasing the frequency of the second AC power, it is possible to decrease the magnitude of the second AC power, whereby it is possible to decrease the magnitude of the load power (current amount of the load current) that is supplied to the load from the power receiver. For example, in a case where the DC/AC converter is an inverter circuit, the first controller changes the frequency of the second AC power by adjusting a switching frequency of each of the switching elements with a driving signal supplied to each switching element included in the inverter circuit. In this way, responsiveness is superior in a case where the magnitude of the second AC power is controlled by controlling the frequency of the second AC power. Further, in a phase shift control, a control is performed upon securing a phase margin of the electric current. For this reason, in a frequency control of the second AC power, an adjustment range of the load power (load current) is larger than that in the phase shift control. Therefore, it is possible to improve the responsiveness of the control of the magnitude of the second AC power and to more surely reduce the ripple caused due to the zero crossing of the voltage of the first AC power.

The first controller may also control the converter such that the magnitude of the second AC power is changed by the phase shift control. The magnitude of the second AC power can be changed by using the phase shift control as well, whereby it is possible to change the magnitude of the load power (current amount of the load current) that is supplied to the load from the power receiver. For example, in a case where the DC/AC converter is an inverter circuit, the first controller controls the electric power by adjusting a switching timing of each of the switching elements to change an ON period of the inverter circuit using the driving signal that is supplied to each of the switching elements included in the inverter circuit. In this way, the phase shift control has the superior responsiveness. Therefore, it is possible to improve the responsiveness of the control of the magnitude of the second AC power.

The first controller may detect the zero crossing timing based on a voltage value of the voltage of the first AC power. In this case, since the zero crossing timing is detected directly from the voltage of the first AC power, the zero crossing timing can be surely detected. As a result, it is possible to more surely reduce the ripple caused due to the zero crossing of the voltage of the first AC power.

The first controller may also detect the zero crossing timing based on an output of the power converter. According to the zero crossing timing of the voltage of the first AC power, a magnitude of the output of the power converter is reduced. For this reason, the zero crossing timing can be detected by detecting a timing at which the magnitude of the output of the power converter is reduced. Accordingly, compared to a case in which the zero crossing timing is detected based on the voltage value of the voltage of the first AC power, since a sensor for detecting the voltage of the first AC power is not required, it is possible to simplify a configuration of the power transmitter.

The wireless power transfer system according to another aspect of the disclosure includes: the above-described power transmitter and the power receiver. The power receiver includes: the detector configured to measure the load voltage, the load current, or the load power that is supplied to the load; and the second controller configured to generate waveform information on a waveform of the load voltage, the load current, or the load power that is measured by the detector. The first controller controls the converter so as to correct the magnitude of the second AC power based on the waveform information.

In the wireless power transfer system, the magnitude of the second AC power is corrected based on the waveform information on the waveform of the load voltage, the load current, or the load power that is supplied to the load. In this way, since it is possible to correct the magnitude of the second AC power according to the waveform of the load voltage, the load current, or the load power that is actually being supplied to the load, it is possible to more surely reduce the ripple caused due to the zero crossing of the voltage of the first AC power.

[2] Exemplification of Embodiments

Hereinafter, embodiments of the disclosure are described in detail with reference to the accompanying drawings. In a description of the drawings, the same or equivalent element is denoted by the same reference numeral, and any repeated description thereof is omitted.

FIG. 1 is a view illustrating an application example of a power transmitter and a wireless power transfer system according to an embodiment. As illustrated in FIG. 1, a wireless power transfer system 1 is provided with a power transmitter 2, and a power receiver 3, and it is a system for supplying electric power from the power transmitter 2 to the power receiver 3. The power transmitter 2 and the power receiver 3 are spaced apart, for example, in a vertical direction. The power transmitter 2 is installed, for example, in a parking lot and the like. The power receiver 3 is mounted, for example, on an electric vehicle EV. The wireless power transfer system 1 is configured to supply the electric power to the electric vehicle EV that has arrived in the parking lot and the like by using magnetic coupling between coils of a magnetic field resonance method, an electromagnetic induction method, or the like. Note that a wireless power transfer method is not limited to a method using the magnetic coupling and may also be a field resonance method, for example.

The power transmitter 2 is a device that supplies the electric power for wireless power transfer. The power transmitter 2 generates a desired AC power from the electric power that is supplied from a power source PS (see FIG. 2) and transmits it to the power receiver 3. The power transmitter 2 is installed in a road surface R of the parking lot and the like. The power transmitter 2 includes, for example, a first coil device 4 (power transmission coil device) provided so as to protrude upward from the road surface R of the parking lot and the like. The first coil device 4 includes a first coil 21 (see FIG. 2) and has, for example, a flat frustum shape or a flat rectangular shape. The power transmitter 2 generates the desired AC power from the power source PS. The generated AC power is transmitted to the first coil device 4, and the first coil device 4 generates a magnetic flux.

Figure 2:
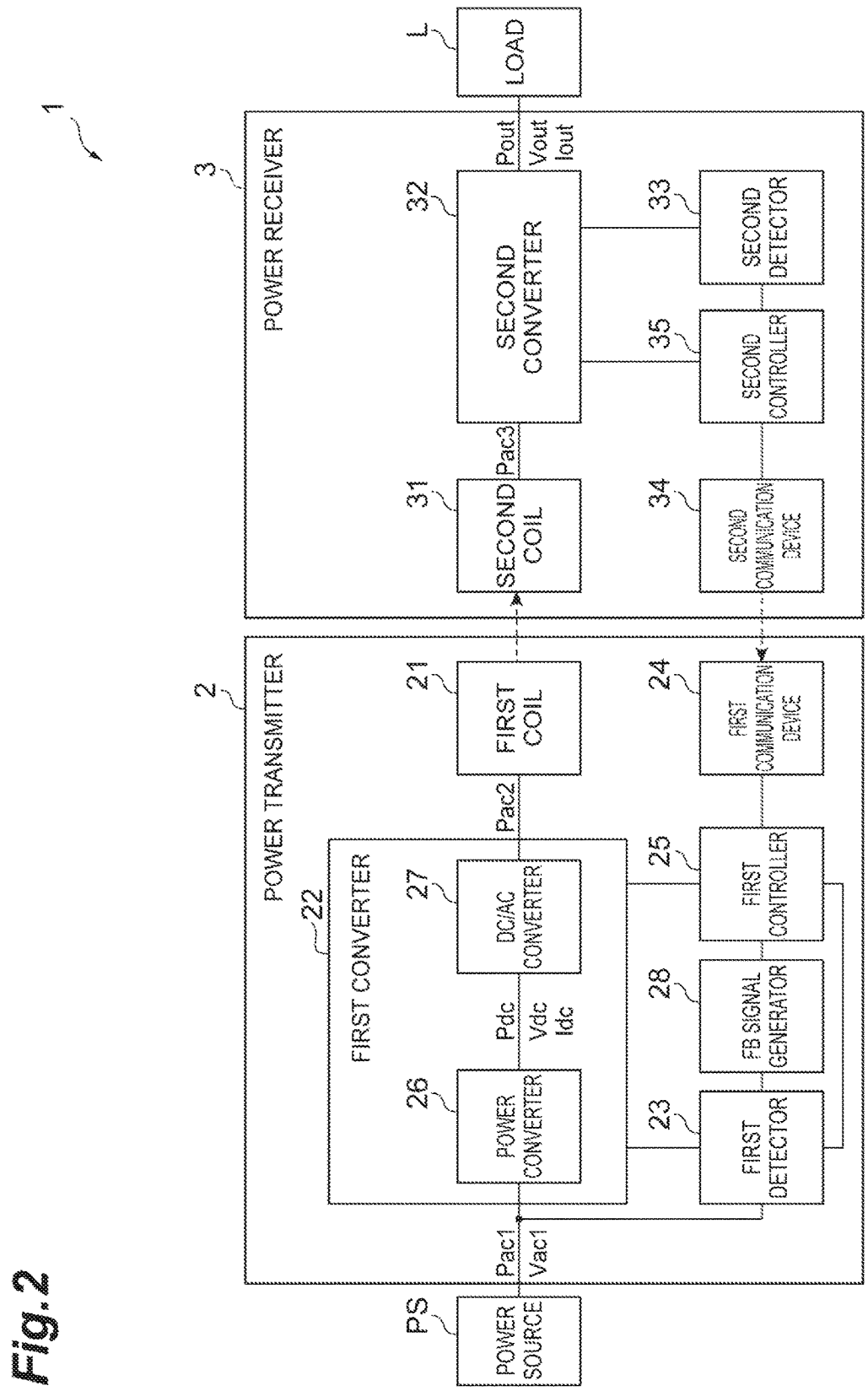
FIG. 2 is a circuit block diagram illustrating a wireless power transfer system according to a first embodiment.

The power receiver 3 is a device that receives the electric power from the power transmitter 2 and supplies the electric power to a load L (see FIG. 2). The power receiver 3 is mounted, for example, on the electric vehicle EV. The power receiver 3 includes, for example, a second coil device 5 (power reception coil device) attached to a bottom surface of a car body (chassis, etc.) of the electric vehicle EV. The second coil device 5 includes a second coil 31 (see FIG. 2), and it faces the first coil device 4 and is spaced apart in the vertical direction therefrom during power feeding. The second coil device 5 has, for example, a flat frustum shape or a flat rectangular shape. By the magnetic flux, which is generated in the first coil device 4, interlinking with the second coil device 5, the second coil device 5 generates an induced current. Accordingly, the second coil device 5 wirelessly receives the electric power from the first coil device 4. The electric power that is received by the second coil device 5 is supplied to the load L.

With reference to FIG. 2, a circuit configuration of the wireless power transfer system 1 according to a first embodiment is described in detail. FIG. 2 is a circuit block diagram illustrating the wireless power transfer system 1 according to the first embodiment. As illustrated in FIG. 2, the wireless power transfer system 1 is a system which receives an AC power Pac1 (first AC power) from the power source PS and supplies a load power Pout to the load L. The power source PS is an AC power source such as a commercial power source, and it supplies the AC power Pac1 to the power transmitter 2. A frequency of the AC power Pac1 is, for example, 50 Hz or 60 Hz. The load L may be a DC load such as a battery or an AC load such as a motor.

The power transmitter 2 is supplied with the AC power Pac1 from the power source PS. The power transmitter 2 includes the first coil 21, a first converter 22, a first detector 23, a first communication device 24, a first controller 25, and a FB signal generator 28 (feedback signal generator).

The first converter 22 is a circuit configured to convert the AC power Pac1 supplied from the power source PS into a desired AC power Pac2 and to supply the AC power Pac2 that has been converted to the first coil 21. The first converter 22 is capable of changing a magnitude of the AC power Pac2, for example, by a frequency control, a phase shift control, and a voltage control of a DC power Pdc that are described below. The first converter 22 includes a power converter 26 and a DC/AC converter 27.

The power converter 26 is an AC/DC converter configured to convert the AC power Pac1, which is supplied from the power source PS, into the DC power Pdc. The power converter 26 is, for example, a rectifier circuit. The rectifier circuit may be constituted of a rectifying element such as a diode or may be constituted of a switching element such as a transistor. The power converter 26 may further have a power factor correction (PFC) function and step-up and step-down functions. The first converter 22 may further include a DC/DC converter provided to an output of the power converter 26. The power converter 26 is controlled by the first controller 25 so as to change a magnitude of a voltage Vdc of the DC power Pdc. The power converter 26 changes the magnitude of the voltage Vdc of the DC power Pdc, for example, by pulse width modulation. The power converter. 26 supplies the DC power Pdc that has been converted to the DC/AC converter 27.

The DC/AC converter 27 converts the DC power Pdc, which has been converted by the power converter 26, into the AC power Pac2. A frequency of the AC power Pac2 is, for example, 81.38 kHz to 90 kHz. The DC/AC converter 27 is, for example, an inverter circuit. The first converter 22 may further include a transformer provided to an output of the DC/AC converter 27. The DC/AC converter 27 is controlled by the first controller 25 so as to change the magnitude of the AC power Pac2. The DC/AC converter 27 supplies the AC power Pac2 that has been converted to the first coil 21.

The first coil 21 is a coil for wirelessly feeding the electric power to the power receiver 3. The first coil 21 generates a magnetic flux as it is supplied with the AC power Pac2 from the first converter 22. Between the first coil 21 and the first converter 22, a capacitor and an inductor (for example, a reactor) may be connected.

The first detector 23 includes a circuit for obtaining a measurement value related to the DC power Pdc. The circuit for obtaining the measurement value related to the DC power Pdc is, for example, a voltage sensor, a current sensor, or a combination thereof. The first detector 23 measures the DC power Pdc, the voltage Vdc of the DC power Pdc, or a current Idc of the DC power Pdc. The first detector 23 outputs the obtained measurement value to the FB signal generator 28.

The first communication device 24 is a circuit for wirelessly communicating with a second communication device 34 of the power receiver 3 described below. The first communication device 24 is, for example, an antenna for a communication method using radio waves or a light-emitting element and a light-receiving element for a communication method using optical signals. The first communication device 24 outputs information received from the power receiver 3 to the first controller 25.

The first controller 25 is a processing device such as a central processing unit (CPU) and a digital signal processor (DSP). The first controller 25 may also include a read only memory (ROM), a random access memory (RAM), an interface circuit for connecting with each unit of the power transmitter 2, and the like.

As a first feedback control (feedback control), based on a first power measurement value (described below) and a first power command value (described below), the first controller 25 performs a power control on the first converter 22 so as to bring the first power measurement value (AC power Pac2) closer to the first power command value. The first controller 25 performs the first feedback control based on a FB signal (feedback signal) generated by the FB signal generator 28. Details of the first feedback control are described below.

Note that the first controller 25 may also perform a command value correction control for correcting the first power command value in addition to the first feedback control. As the command value correction control, based on a second power measurement value (described below) and a second power command value (described below) received from the power receiver 3 through the first communication device 24, the first controller 25 performs a power control on the first converter 22 so as to bring the second power measurement value (load power Pout) closer to the second power command value. Details of the command value correction control are described below.

By controlling the first converter 22, the first controller 25 controls, as the power control, the magnitude of the AC power Pac2 and controls the magnitude of the load power Pout that is supplied to the load L. The power control is performed by using at least one of the frequency control, the phase shift control, and the voltage control of the DC power Pdc. In each of the controls, a power control parameter for controlling the magnitude of the AC power Pac2 is changed.

By changing a frequency f of the AC power Pac2, the first controller 25 performs the frequency control for changing the magnitudes of the AC power Pac2 and the load power Pout. The above-described power control parameter in the frequency control is the driving frequency f of the DC/AC converter 27 (inverter circuit). The frequency of the AC power Pac2 refers to a frequency of the alternating current or the AC voltage that is output from the first converter 22.

By changing an ON period of the DC/AC converter 27 (inverter circuit), the first controller 25 performs the phase shift control for changing the magnitudes of the AC power Pac2 and the load power Pout. For example, in a case where the DC/AC converter 27 is an inverter circuit, the first controller 25 changes the ON period of the switching element by adjusting a supply time of the driving signal to a plurality of switching elements included in the inverter circuit. The above-described power control parameter in the phase shift control is the ON period of the inverter circuit.

By changing the magnitude of the voltage Vdc of the DC power Pdc, the first controller 25 performs the voltage control for changing the magnitudes of the AC power Pac2 and the load power Pout. A change in the voltage Vdc of the DC power Pdc is carried out, for example, by using the step-up and step-down functions of the above-described power converter 26. The above-described power control parameter in the control of the DC power Pdc is the magnitude of the voltage Vdc of the DC power Pdc. The step-up and step-down functions may be achieved, for example, by a chopper circuit.

The FB signal generator 28 generates the FB signal based on the measurement value of the current Idc detected by the first detector 23. The FB signal generator 28 is implemented in hardware. As the hardware, for example, a combination of an integrating circuit, a comparator, a mono-stable multivibrator, an operational amplifier, and the like as well as a waveform generation integrated circuit (IC) may be used. Further, the FB signal generator 28 may also be achieved by allowing the processing device such as the CPU and the DSP to read predetermined software. A detailed configuration of the FB signal generator 28 is described below.

The power receiver 3 includes the second coil 31, a second converter 32, a second detector 33, the second communication device 34, and a second controller 35.

The second coil 31 is a coil for receiving the electric power wirelessly supplied from the power transmitter 2. By the magnetic flux generated by the first coil 21 interlinking with the second coil 31, an AC power Pac3 is generated in the second coil 31. The second coil 31 supplies the AC power Pac3 to the second converter 32. Note that between the second coil 31 and the second converter 32, a capacitor and an inductor (for example, a reactor) may be connected.

The second converter 32 is a circuit configured to convert the AC power Pac3 received by the second coil 31 into the load power Pout desirable for the load L. In a case where the load L is a DC load, the second converter 32 is the AC/DC converter (rectifier circuit) configured to convert the AC power Pac3 into the DC load power Pout. In this case, the second converter 32 may include the step-up and step-down functions to output the load power Pout desirable for the load L. The step-up and step-down functions may be achieved, for example, by a chopper circuit or a transformer. The second converter 32 may further include a transformer that is provided to an input of the AC/DC converter.

In a case where the load L is an AC load, the second converter 32 further includes the DC/AC converter (inverter circuit) in addition to the AC/DC converter configured to convert the AC power Pac3 into the DC power. The DC/AC converter converts the DC power converted by the AC/DC converter into the AC load power Pout. The second converter 32 may further include a transformer that is provided to the input of the AC/DC converter. Note that in a case where the AC power Pac3 supplied from the second coil 31 is the AC power desirable for the load L, the second converter 32 may be omitted.

The second detector 33 is a circuit for obtaining a measurement value related to the load power Pout that is supplied to the load L. The second detector 33 measures a load voltage Vout, a load current Iout, or the load power Pout that is supplied to the load L. The second detector 33 is, for example, a voltage sensor, a current sensor, or a combination thereof. The second detector 33 outputs the obtained measurement value to the second controller 35. The load L outputs the second power command value to the second controller 35. The second power command value indicates a magnitude of desirable electric power to be supplied to the load L. For example, in a case where the load L is a storage battery, the second power command value may be a command value of current, voltage, or electric power determined according to a state of charge (SOC) of the load L.

The second communication device 34 is a circuit for wirelessly communicating with the first communication device 24 of the power transmitter 2. Through the second communication device 34, the power receiver 3 is capable of communicating with the power transmitter 2. The second communication device 34 is, for example, an antenna for a communication method using radio waves or a light-emitting element and a light-receiving element for a communication method using optical signals. The second communication device 34 transmits information received from the second controller 35 to the power transmitter 2.

The second controller 35 is a processing device such as a CPU and a DSP. The second controller 35 may include a ROM, a RAM, an interface circuit for connecting with each unit of the power receiver 3, and the like. The second controller 35 calculates the second power measurement value based on the measurement value received from the second detector 33. The second controller 35 transmits the second power measurement value and the second power command value received from the load L to the power transmitter 2 through the second communication device 34.

Note that for example, by connecting the power transmitter 2 to a storage battery of an electric vehicle in place of the power source PS and by connecting the power receiver 3 to the power source PS in place of the load L, it is also possible to transmit the electric power from the power receiver 3 to the power transmitter 2.

Figure 3:
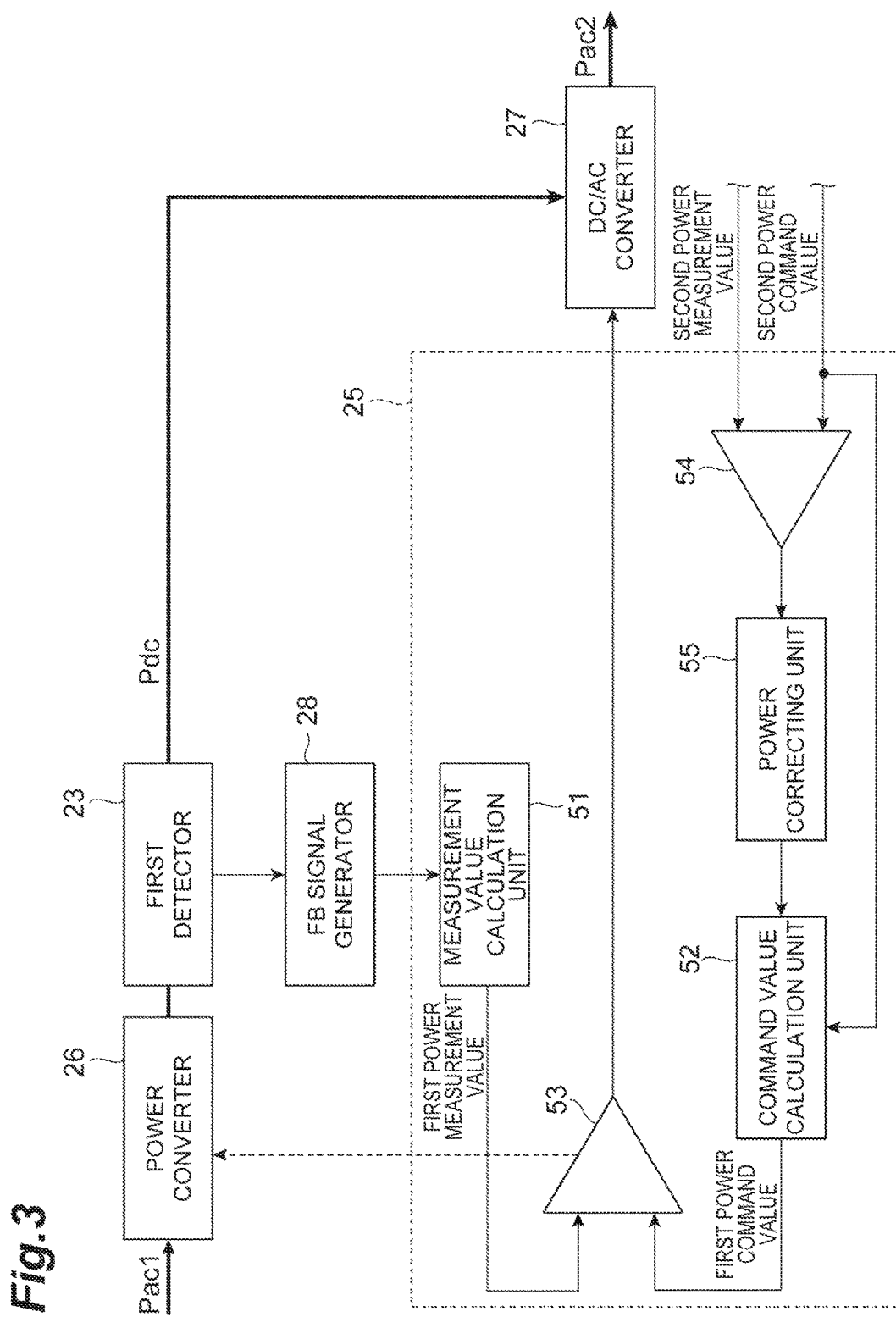
FIG. 3 is a schematic diagram illustrating a feedback control.

Now, with reference to FIG. 3, the first feedback control and the command value correction control are described in detail. FIG. 3 is a schematic diagram of the feedback control. As illustrated in FIG. 3, the first controller 25 includes a measurement value calculation unit 51, a command value calculation unit 52, a comparing unit 53, a comparing unit 54, and a power correcting unit 55.

The measurement value calculation unit 51 calculates the first power measurement value based on the FB signal received from the FB signal generator 28. The first power measurement value is a measurement value including a loss of the DC/AC converter 27, a loss of the first coil 21 (see FIG. 2), and the like as well as the AC power Pac2 supplied from the DC/AC converter 27 to the first coil 21. The measurement value calculation unit 51 outputs the first power measurement value that has been calculated to the comparing unit 53.

The command value calculation unit 52 calculates the first power command value based on the second power command value received from the power receiver 3 through the first communication device 24. The command value calculation unit 52 corrects the first power command value based on a correction value received from the power correcting unit 55. The command value calculation unit 52 outputs the first power command value to the comparing unit 53. Note that the command value calculation unit 52 may use an initial value that is set in advance as the first power command value until it receives the second power command value from the power receiver 3.

The comparing unit 53 compares the first power measurement value calculated by the measurement value calculation unit 51 and the first power command value calculated by the command value calculation unit 52. Then, the comparing unit 53 calculates the power control parameter to bring the first power measurement value closer to the first power command value. Based on the calculated power control parameter, the comparing unit 53 controls the power converter 26 or the DC/AC converter 27.

The comparing unit 54 compares the second power measurement value and the second power command value that are received from the power receiver 3 through the first communication device 24 and outputs a comparison result to the power correcting unit 55. For example, the comparing unit 54 subtracts the second power command value from the second power measurement value and outputs a subtraction result to the power correcting unit 55.

Based on the comparison result received from the comparing unit 54, the power correcting unit 55 calculates a correction value for bringing the second power measurement value closer to the second power command value. The power correcting unit 55 outputs the calculated correction value to the command value calculation unit 52.

In the first feedback control, the first controller 25 performs the power control so as to bring the first power measurement value calculated by the measurement value calculation unit 51 closer to the first power command value calculated by the command value calculation unit 52. In the command value correction control, the first controller 25 corrects the first power command value so as to bring the second power measurement value received from the power receiver 3 closer to the second power command value received from the power receiver 3.

Figure 4:
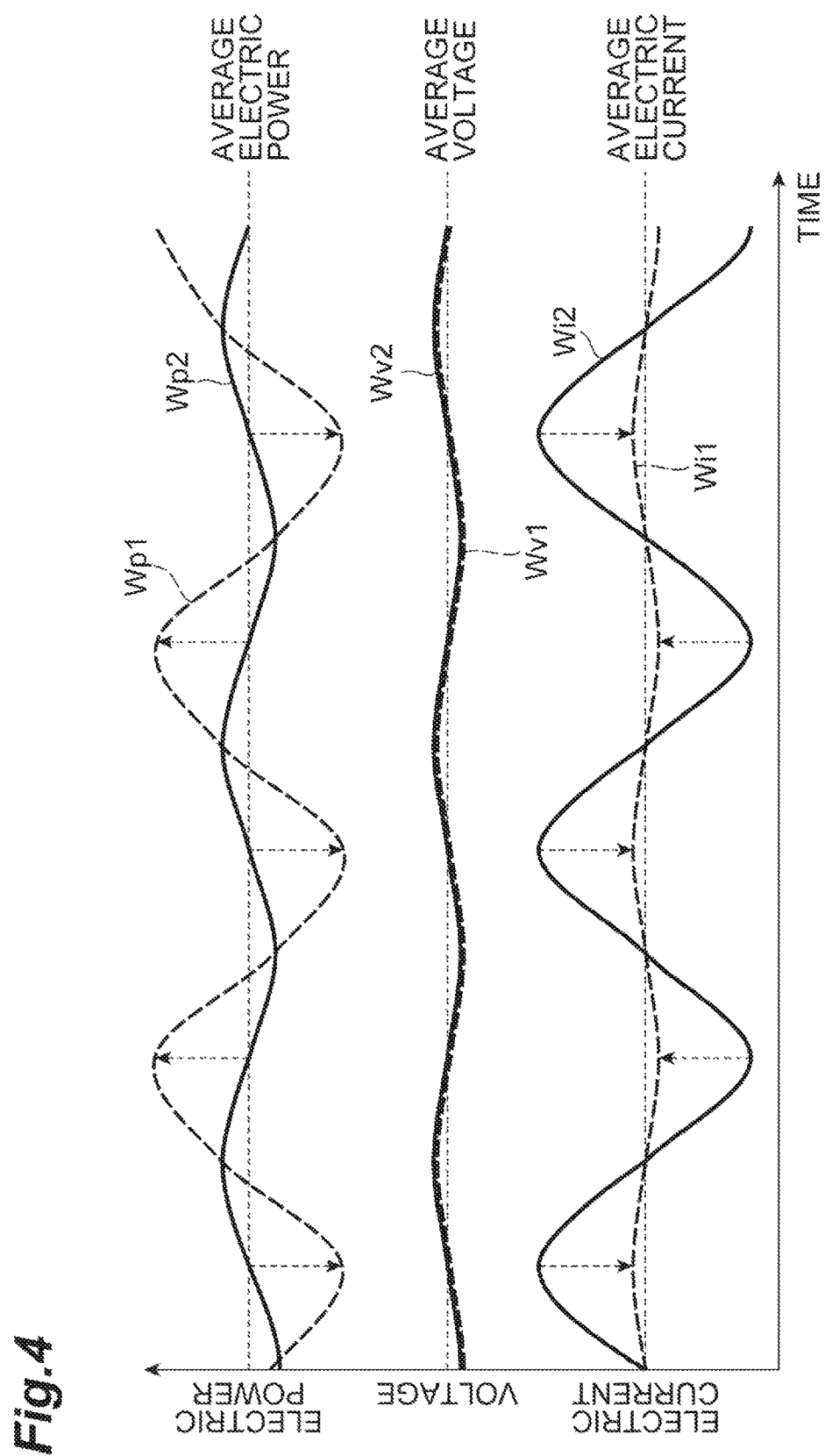
FIG. 4 is a graph for explaining a ripple.

Next, with reference to FIG. 4, the ripple in a case where the first feedback control is performed is described. FIG. 4 is a graph for explaining the ripple.

A waveform Wp2, a waveform Wv2, and a waveform Wi2 are waveforms of the AC power Pac2, the voltage Vdc, and the current Idc, respectively, in a case where a conventional feedback control (second feedback control), not the first feedback control, is performed. In the conventional feedback control, the power transmitter 2 receives information on the load power Pout from the power receiver 3 and controls the first converter 22 such that the load power Pout becomes a desirable electric power. The conventional feedback control is described, for example, in Patent Literature 2.

However, since the conventional feedback control requires wireless communication between the power transmitter 2 and the power receiver 3, in a case where a delay time or a break occurs in the communication, there is a possibility that the control of the load power Pout is not appropriately performed. Therefore, in this embodiment, the first feedback control that requires no wireless communication between the power transmitter 2 and the power receiver 3 is employed. A waveform Wp1, a waveform Wv1, and a waveform Wi1 of FIG. 4 are waveforms of the AC power Pac2, the voltage Vdc, and the current Idc, respectively, in a case where the first feedback control is performed.

In performing the first feedback control as described above, the first controller 25 performs the power control so as to bring the first power measurement value that is calculated based on the current Idc closer to the first power command value by the first feedback control.

In the power transmitter 2, the power converter 26 of the first converter 22 performs a full-wave rectification on the AC power Pac1 supplied from the power source PS and generates the DC power Pdc from the AC power Pac1 that has been full-wave rectified using the PFC function and step-up and step-down functions. With the DC power Pdc generated in this way, a voltage value of the voltage Vdc may decrease by several volts near a zero crossing timing of a voltage Vac1 of the AC power Pac1 due to the zero crossing of the voltage Vac1. The zero crossing timing of the voltage Vac1 refers to timing at which a voltage value of the voltage Vac1 is switched from a positive value to a negative value or from a negative value to a positive value. That is, the zero crossing timing of the voltage Vac1 refers to timing at which the voltage value of the voltage Vac1 is 0 V. In this way, as illustrated in FIG. 4, when a ripple is caused to the voltage Vdc (see the waveform Wv2), a ripple is also caused to the current Idc and the AC power Pac2 (see the waveform Wp2 and the waveform Wi2).

Since the capacitor is provided to an input of the DC/AC converter 27, an impedance when the power receiver 3 is viewed from the power converter 26 is capacitive. Therefore, a phase of the current Idc is ahead of a phase of the voltage Vdc by 90 degrees. When the first feedback control is performed in such condition, as illustrated in FIG. 4, to bring the first power measurement value calculated based on the current Idc closer to the first power command value, the first controller 25 performs the power control so as to reduce the ripple of the current Idc (see the waveform Wi1).

The voltage Vdc is not affected by this power control (see the waveform WV1). However, since the phase of the current Idc is ahead of a phase of the AC power Pac2 by 90 degrees, as a result of performing the power control to reduce the ripple of the current Idc, during a period of power control in which the current Idc is made smaller, the AC power Pac2 is decreased below an average electric power, and during a period of power control in which the current Idc is made larger, the AC power Pac2 is increased exceeding the average electric power (see the waveform Wp1). Accordingly, the AC power Pac2 becomes unstable, and a ripple of the load current Iout is increased.

Therefore, to stabilize the AC power Pac2, the FB signal generator 28 generates a FB signal in which the ripple of the current Idc is reduced. Hereinafter, a structure of the FB signal generator 28 is described.

Figure 5:
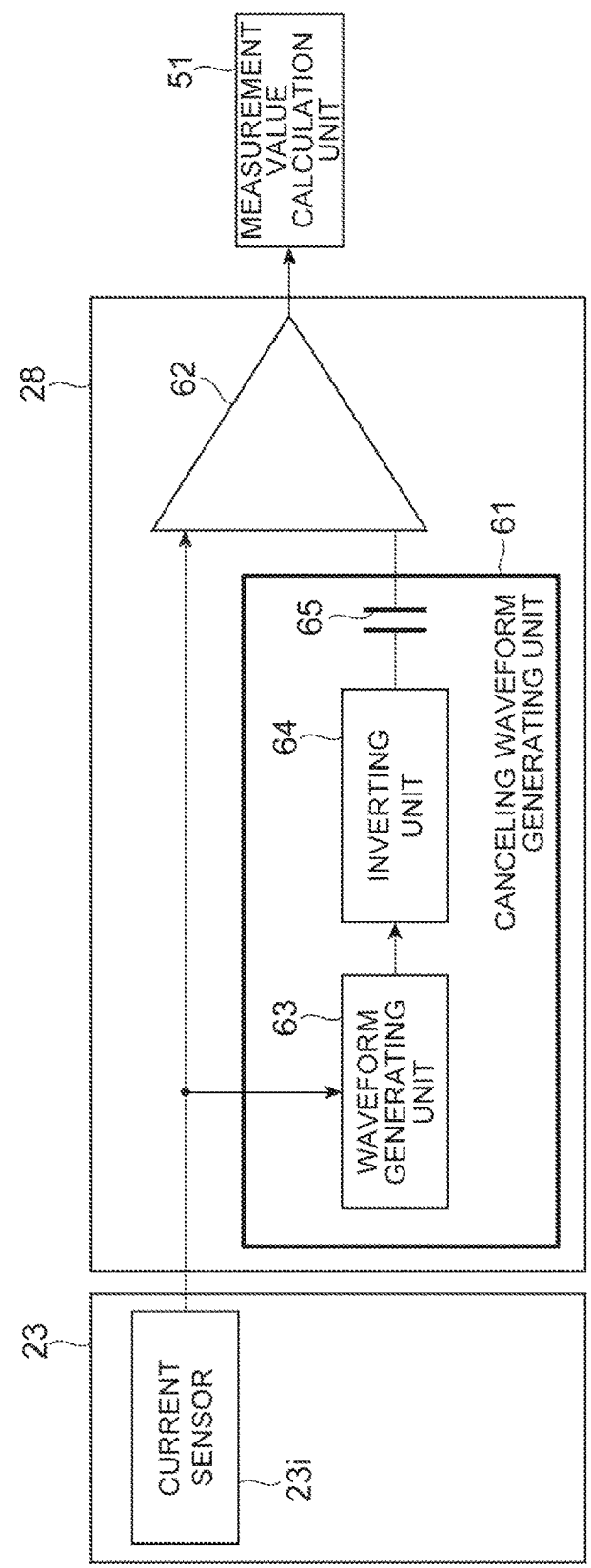
FIG. 5 is a block diagram illustrating a configuration of a first detector and a FB signal generator of the wireless power transfer system according to the first embodiment.

With reference to FIG. 5, a configuration of the FB signal generator of the wireless power transfer system 1 according to the first embodiment is described in detail. FIG. 5 is a block diagram illustrating a configuration of the first detector 23 and the FB signal generator 28 of the wireless power transfer system 1 according to the first embodiment.

As illustrated in FIG. 5, the FB signal generator 28 receives a measurement value of the current Idc detected by a current sensor 23i of the first detector 23. To the measurement value, there is caused the ripple due to the zero crossing of the voltage Vac1 described above. The FB signal generator 28 includes a canceling waveform generating unit 61 and a combining unit 62.

The canceling waveform generating unit 61 generates a canceling waveform to reduce the ripple of the measurement value of the current Idc and outputs the canceling waveform to the combining unit 62. The canceling waveform is a waveform for reducing the ripple caused in the current Idc due to the zero crossing of the voltage Vac1. The canceling waveform has, for example, an inverted component of the ripple caused to the current Idc. The canceling waveform generating unit 61 includes a waveform generating unit 63, an inverting unit 64, and a capacitor 65.

The waveform generating unit 63 receives the measurement value of the current Idc and generates a ripple waveform based on a waveform of the measurement value. The ripple waveform has the same component as the ripple caused to the current Idc. Specifically, the waveform generating unit 63 uses the waveform of the measurement value of the current Idc as the ripple waveform. The waveform generating unit 63 outputs the ripple waveform to the inverting unit 64. The waveform generating unit 63 may be implemented in hardware or may be implemented in software. Note that the canceling waveform generating unit 61 may also have a configuration in which, in place of the waveform generating unit 63, the first detector 23 and the inverting unit 64 are directly connected and the measurement value of the current Idc from the current sensor 23i is input directly to the inverting unit 64.

The inverting unit 64 inverts the ripple waveform generated by the waveform generating unit 63. The inverting unit 64 outputs the inverted ripple waveform to the capacitor 65. The inverting unit 64 may be implemented in hardware such as an operational amplifier or may be implemented in software. A signal in which the ripple waveform has been inverted is output from the inverting unit 64, for example, by inputting the ripple waveform from the waveform generating unit 63 to an inverting input terminal of the operational amplifier.

The capacitor 65 functions as a coupling capacitor. The capacitor 65 removes a DC component from the ripple waveform inverted by the inverting unit 64 and outputs an AC component as the canceling waveform to the combining unit 62. In place of the capacitor 65, a function to remove the DC component from the ripple waveform, which has been inverted by the inverting unit 64, may also be implemented in software.

The combining unit 62 generates the FB signal by combining the measurement value of the current Idc and the canceling waveform generated by the canceling waveform generating unit 61. The combining unit 62 generates the FB signal, for example, by superimposing (adding) the canceling waveform on the measurement value of the current Idc. The combining unit 62 outputs the FB signal to the measurement value calculation unit 51. The combining unit 62 may be implemented in hardware such as the operational amplifier or may be implemented in software.

In this way, the FB signal generator 28 generates the canceling waveform by inverting the measurement value of the current Idc detected by the first detector 23 and by extracting the AC component therefrom. Then, the FB signal generator 28 generates the FB signal based on the measurement value of the current Idc and the canceling waveform.

Figure 6:
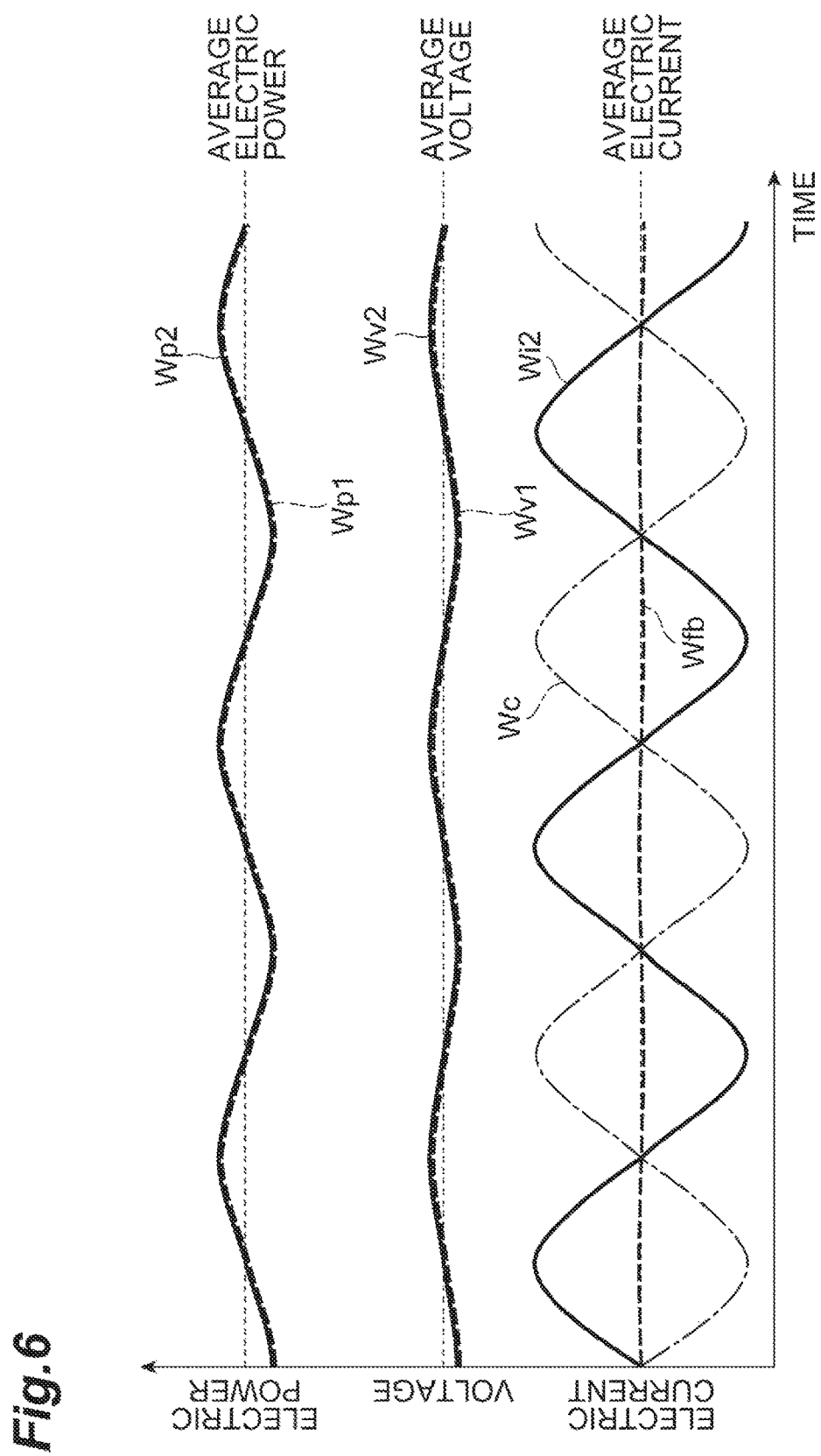
FIG. 6 is a graph for explaining operation of the wireless power transfer system of FIG. 2.

Next, with reference to FIGS. 5 and 6, an effect and a function of the wireless power transfer system 1 are described. FIG. 6 is a graph for explaining operation of the wireless power transfer system 1. The waveform Wp2, the waveform Wv2, and the waveform Wi2 are waveforms of the AC power Pac2, the voltage Vdc, and the current Idc, respectively, in a case where the conventional feedback control is performed. The waveform Wp1 and the waveform Wv1 are waveforms of the AC power Pac2 and the voltage Vdc, respectively, in a case where the first feedback control is performed. A waveform Wc is a canceling waveform, and a waveform Wfb is a waveform of the FB signal.

As illustrated in FIG. 6, due to the zero crossing of the voltage Vac1, a ripple is caused to the current Idc (see the waveform Wi2). The canceling waveform generating unit 61, upon receiving the measurement value of the current Idc from the current sensor 23i, inverts the waveform of the measurement value of the current Idc and generates the canceling waveform Wc by extracting the AC component of the inverted waveform. Then, the combining unit 62 generates the FB signal (see the waveform Wfb) by adding the canceling waveform Wc to the measurement value of the current Idc. Accordingly, the first feedback control is performed by using the FB signal in which the ripple has been removed from the measurement value of the current Idc. In the first feedback control, since no power control is performed to reduce a ripple of the FB signal, there is no change in the AC power Pac2 accompanying a change in the current Idc, whereby an increase in the ripple of the AC power Pac2 can be suppressed (see the waveform Wp1).

In the wireless power transfer system 1 and the power transmitter 2, the AC power Pac1 is converted into the DC power Pdc by the power converter 26. To the current Idc of the DC power Pdc, the ripple may be caused due to the zero crossing of the voltage Vac1 of the AC power Pac1. In the power transmitter 2, the current Idc is detected (measured), the canceling waveform to reduce the ripple of the current Idc is generated, and the FB signal is generated based on the measurement value of the current Idc and the canceling waveform. The canceling waveform is obtained by inverting the measurement value of the current Idc and by extracting the AC component therefrom. For this reason, the ripple of the measurement value of the current Idc is cancelled, for example, by superimposing the canceling waveform on the measurement value of the current Idc, whereby in the FB signal, the ripple is reduced compared to the measurement value of the current Idc. Then, based on the FB signal in which the ripple has been reduced, the first feedback control of the AC power Pac2 to be supplied to the power receiver 3 is performed. Accordingly, there is no change in the AC power Pac2 accompanying a change of the current Idc, whereby it is possible to stabilize the current amount of the load current Iout that is supplied to the load L. As a result, it is possible to reduce the ripple caused to the load current Iout due to the zero crossing of the voltage Vac1 of the AC power Pac1.

In generating the canceling waveform, the measurement value of the current Idc is used. For this reason, the ripple caused to the measurement value of the current Idc can be directly used, whereby it is possible to reduce the ripple accurately from the measurement value of the current Idc. Further, even in a case where the frequency of the AC power Pac1 and the load power Pout are changed, the waveform obtained by inverting the measurement value of the current Idc is used as the canceling waveform. For this reason, it is not necessary to use a complicated circuit to generate the canceling waveform, and it is possible to simplify a generation process of the canceling waveform.

In a case where a person gets on and off the electric vehicle EV during charging or in a case where the person loads or unloads a baggage on and from the electric vehicle EV, the electric vehicle EV is swung up and down by a suspension of the electric vehicle EV, and a gap between the first coil 21 and the second coil 31 is changed. Further, during a transition period such as when charging starts and charging stops, the voltage Vdc is increased or decreased. In such cases, the measurement value of the current Idc includes not only the ripple caused due to the zero crossing of the voltage Vac1 of the AC power Pac1 but also frequency components of a gap variation and a transient response. A frequency of the gap variation is, for example, equal to or smaller than about 5 Hz, and a frequency based on inclination of stepping up or stepping down of the voltage Vdc is, for example, equal to or smaller than about 30 Hz. On the other hand, a frequency of the ripple caused to the measurement value of the current Idc is twice the frequency of the AC power Pac1 of the power source PS, and is, for example, a low frequency of about 100 Hz.

As described above, in the first feedback control, the measurement value of the current Idc may be constituted of the DC component and a variation of the AC component such the gap variation and the transient response, and the ripple is unnecessary. For this reason, in a case where a low pass filter (LPF) constituted of a resistance element, a capacitor, and the like is used to remove the ripple from the measurement value of the current Idc, the frequency component of the gap variation and the transient response are also removed.

In contrast, in the wireless power transfer system 1 and the power transmitter 2, frequency responsiveness is improved since the LPF constituted of the resistance element, the capacitor, and the like is not used. Note that by superimposing the canceling waveform, which is generated by inverting the measurement value of the current Idc, on the measurement value of the current Idc, not only the ripple but also a part of the frequency component of the gap variation and the transient response may also be removed. In this case, the load power Pout may be changed at the time of the gap variation and the transient response, whereby responsiveness (followability) of the load power Pout relative to the gap variation and the transient response is decreased. However, it is possible to provide a protection function so as to prevent the load power Pout from exceeding a predetermined maximum allowable value although the load power Pout (the AC power Pac1, the DC power Pdc, etc.) varies during the gap variation. In this way, a slight decrease in the responsiveness of the load power Pout is not a practical problem.

Note that in a case where a change amount of a coupling coefficient between the first coil 21 and the second coil 31 due to the gap variation is small, an influence from a part of the frequency component of the gap variation and the transient response being removed is even smaller. As described above, although a part of the frequency component of the gap variation and the transient response is removed from the measurement value of the current Idc, the responsiveness of the frequency is relatively good, whereby it is in a state having no practical problem. As a result, it is possible to reduce the ripple caused to the load current Iout due to the zero crossing of the voltage Vac1.

Second Embodiment

Figure 7:
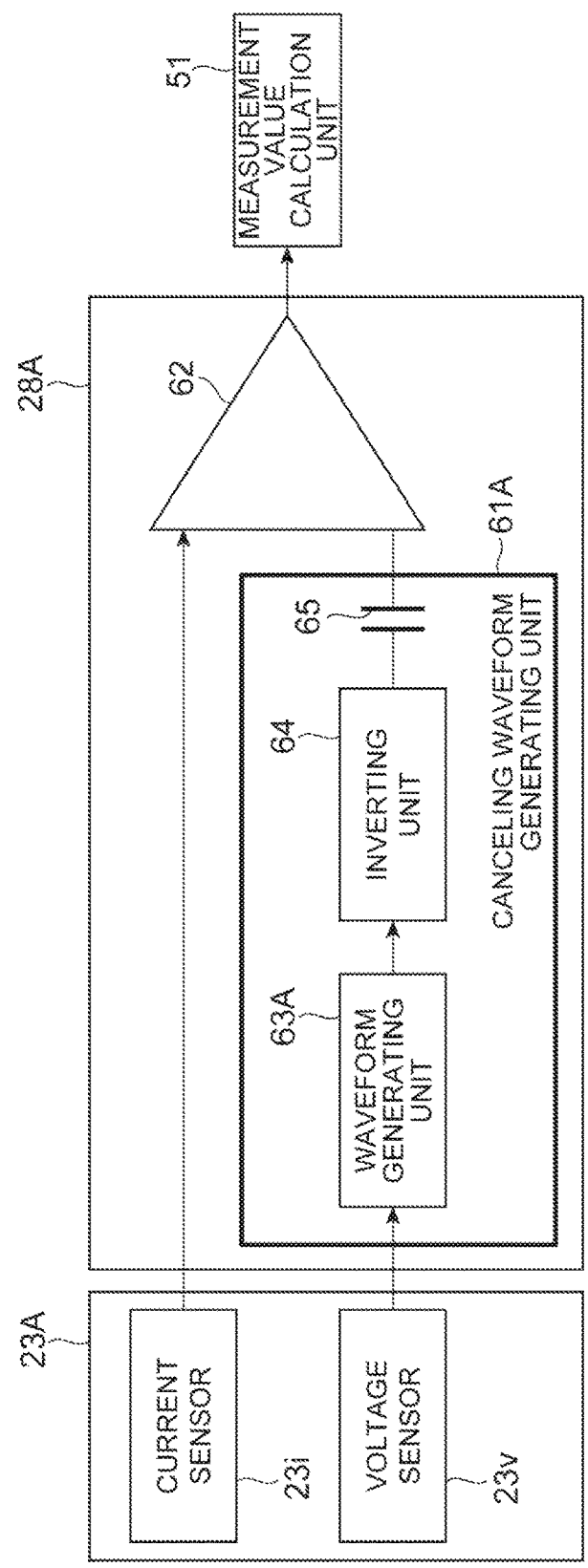
FIG. 7 is a block diagram illustrating a configuration of a first detector and a FB signal generator of a wireless power transfer system according to a second embodiment.

With reference to FIG. 7, a configuration of an FB signal generator of a wireless power transfer system 1 according to a second embodiment is described in detail. FIG. 7 is a block diagram illustrating a configuration of a first detector 23A and an FB signal generator 28A of the wireless power transfer system 1 according to the second embodiment.

As illustrated in FIG. 7, the first detector 23A is different from the first detector 23 mainly in that it further includes a circuit for detecting the zero crossing timing of the voltage Vac1 of the AC power Pac1 supplied from the power source PS. Specifically, the first detector 23A detects the zero crossing timing of the voltage Vac1 based on the voltage value of the voltage Vac1. The first detector 23A includes a voltage sensor 23v configured to measure the voltage Vac1. The voltage sensor 23v decreases the voltage Vac1 through a resistance element (not illustrated) and, by monitoring the decreased voltage, detects the zero crossing timing. The voltage sensor 23v outputs synchronization information indicating the zero crossing timing to the FB signal generator 28A. As the synchronization information, the voltage sensor 23v outputs, for example, a pulse signal at timing when the voltage value of the voltage Vac1 becomes 0 V.

The FB signal generator 28A generates the canceling waveform based on the AC power Pac1. The FB signal generator 28A is different from the FB signal generator 28 mainly in that it includes a canceling waveform generating unit 61A in place of the canceling waveform generating unit 61. The canceling waveform generating unit 61A is different from the canceling waveform generating unit 61 mainly in that it includes a waveform generating unit 63A in place of the waveform generating unit 63.

The waveform generating unit 63A is different from the waveform generating unit 63 in a method for generating the ripple waveform. The frequency of the ripple of the current Idc is the same as a frequency of the zero crossing timing of the voltage Vac1 and is twice the frequency of the AC power Pac1. Further, a phase of the ripple of the current Idc is shifted from the zero crossing timing of the voltage Vac1 by a predetermined delay amount. For this reason, the waveform generating unit 63A determines a period and a phase of the ripple of the current Idc based on the synchronization information and phase information. The phase information is information indicating the delay amount of the phase of the ripple of the current Idc relative to the zero crossing timing of the voltage Vac1. The delay amount of the phase is represented by a predetermined ratio to a period of the zero crossing and is determined by a circuit configuration of the power converter 26. The phase information is obtained in advance through an experiment and the like and is stored.

Amplitude of the ripple of the current Idc is substantially proportional to the DC power Pdc. The waveform generating unit 63A calculates, for example, the DC power Pdc from the measurement value related to the DC power Pdc and calculates the amplitude by using a first characteristic table. The first characteristic table is a table indicating a relationship between the DC power Pdc and the amplitude of the ripple of the current Idc. The first characteristic table may also be a table indicating a relationship between the current Idc or the voltage Vdc and the amplitude of the ripple of the current Idc. Note that in calculating the amplitude, in place of the DC power Pdc, the measurement value related to the AC power Pac1 and the AC power Pac1 may be used or the first power command value may be used. Further, in calculating the amplitude, it is also possible to use the voltage Vdc in place of the DC power Pdc.

In this way, the waveform generating unit 63A generates the ripple waveform based on the synchronization information, the phase information, and the measurement value related to the DC power Pdc. Specifically, the waveform generating unit 63A generates the ripple waveform including the ripple having the amplitude calculated from the measurement value related to the DC power Pdc in the phase delayed by the delay amount indicated by the phase information from the zero crossing timing indicated by the synchronization information. Such ripple waveform may also be generated, for example, by integrating a square wave and by adding a third waveform and a fourth waveform to a secondary waveform by a predetermined gain.

By the wireless power transfer system 1 and the power transmitter 2 according to the second embodiment described above as well, the same effect as the wireless power transfer system 1 and the power transmitter 2 according to the first embodiment can be obtained. Further, in the wireless power transfer system 1 and the power transmitter 2 according to the second embodiment, the canceling waveform is generated not based on the measurement value of the current Idc but on the AC power Pac1. For this reason, it is possible to reduce the ripple relative to the measurement value of the current Idc without affecting the frequency component of the gap variation, the transient response, and the like.

As above, the embodiments of the disclosure have been described; however, the present invention is not limited to the above embodiments. For example, the wireless power transfer system 1 is applicable not only to the electric vehicle EV but also to a movable object such as a plug-in hybrid vehicle and an underwater sailing body as well as a non-movable object.

Figure 8:
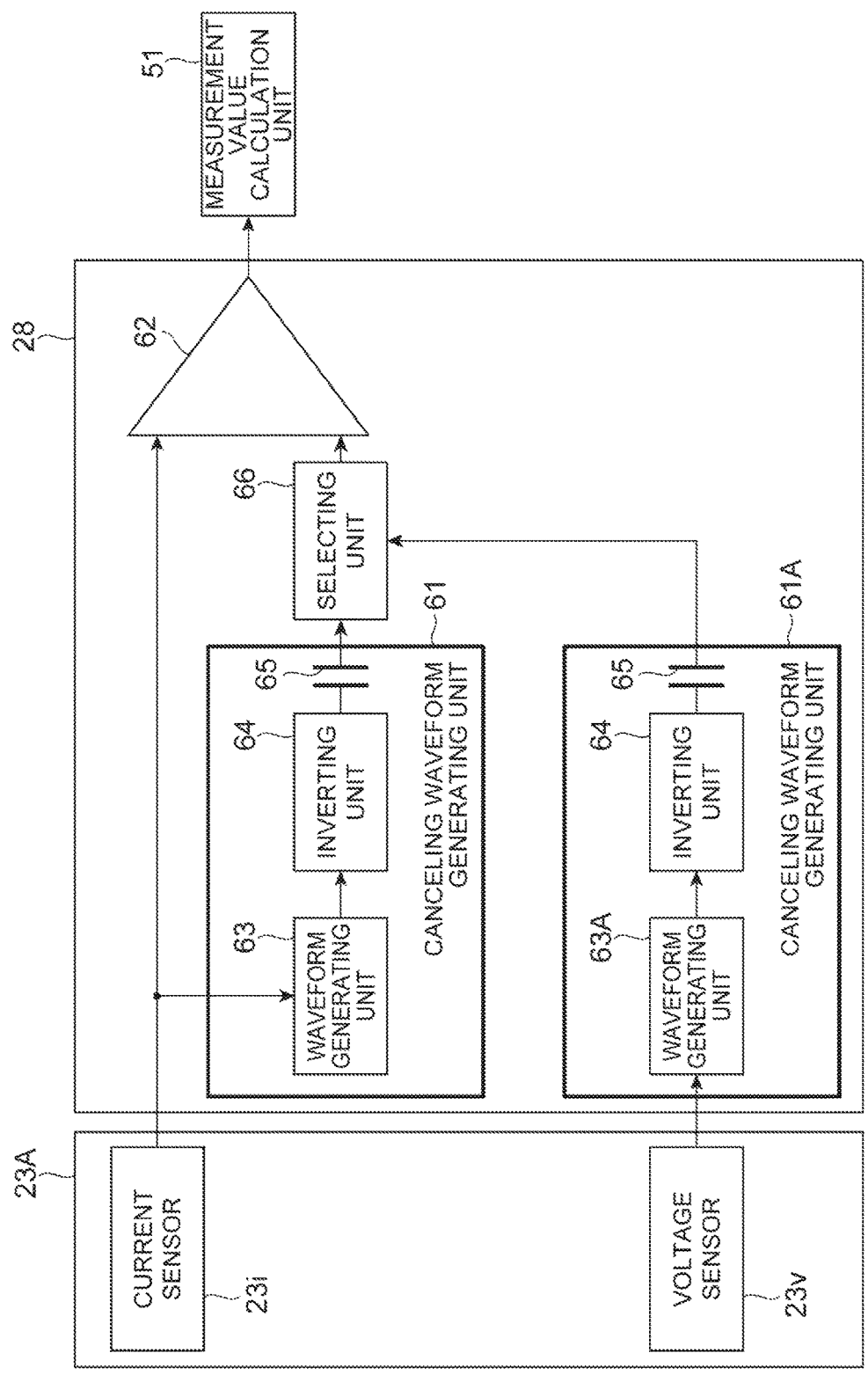
FIG. 8 is a block diagram illustrating a modification of the first detector, a first controller, and the FB signal generator of the wireless power transfer system according to the first embodiment.

Further, as illustrated in FIG. 8, the FB signal generator 28 may include the canceling waveform generating unit 61 (first generating unit), the canceling waveform generating unit 61A (second generating unit), the combining unit 62, and a selecting unit 66. The selecting unit 66 selects and outputs either of the canceling waveform generated by the canceling waveform generating unit 61 or the canceling waveform generated by the canceling waveform generating unit 61A. The selecting unit 66 is, for example, a selector. The selecting unit 66 may select, for example, the canceling waveform generating unit 61 in an initial state. In this case, the selecting unit 66 may switch to the canceling waveform generating unit 61A in a case where the current amount of the load current Iout is changed by the gap variation and the like and where an absolute value of an ripple amount of the load current Iout exceeds a predetermined value. The ripple amount of the load current Iout is calculated, for example, by subtracting the current amount of the load current Iout from a desired current amount. In this way, it is possible to select the method for generating the canceling waveform according to an influence degree on the frequency component such as the gap variation.

In the above embodiment, there is described a method for suppressing the ripple due to the zero crossing of the voltage Vac1 from increasing by using the first feedback control. Hereinafter, there is described a modification for reducing the ripple due to the zero crossing of the voltage Vac1 (see the waveform Wp1 and the waveform Wv1 in FIG. 6) as well as for further reducing the ripple of the load current Iout.

(First Modification)

The FB signal generators 28 and 28A according to the first modification correct the canceling waveform based on a correction waveform for reducing an influence of the ripple caused to the voltage Vdc due to the zero crossing of the voltage Vac1. The correction waveform is a waveform for reducing the ripple caused to the AC power Pac2 by the ripple of the voltage Vdc. For this reason, for example, the waveform generating units 63 and 63A generate the correction waveform including a component having the same period and phase as the ripple caused to the AC power Pac2 by the ripple of the voltage Vdc. Note that in the first modification, since the synchronization information is used, the power transmitter 2 includes the first detector 23A.

A frequency of the ripple of the AC power Pac2 is the same as the frequency of the zero crossing timing of the voltage Vac1 and is twice the frequency of the AC power Pac1. Further, the phase of the ripple of the AC power Pac2 is shifted from the zero crossing timing of the voltage Vac1 by a predetermined delay amount. For this reason, the waveform generating units 63 and 63A determines the period and the phase of the ripple of the AC power Pac2 caused by the ripple of the voltage Vdc based on the synchronization information and second phase information. The second phase information is information indicating the delay amount of the phase of the ripple of the AC power Pac2 relative to the zero crossing timing of the voltage Vac1. The delay amount of the phase is represented by a predetermined ratio to the period of the zero crossing and is determined by the circuit configuration of the power converter 26. The second phase information is obtained in advance through an experiment and the like and is stored.

The waveform generating units 63 and 63A include a ripple table associating a magnitude of the DC power Pdc with a ripple amount caused to the AC power Pac2, and a first conversion table associating a change amount of the current Idc with a change amount of the AC power Pac2. Using the ripple table, the waveform generating units 63 and 63A estimate the ripple amount caused to the AC power Pac2 from the magnitude of the DC power Pdc measured by the first detector 23A. Using the first conversion table, the waveform generating units 63 and 63A calculate the change amount of the current Idc for reducing the estimated ripple amount.

The waveform generating units 63 and 63A, for the period and the phase of the ripple of the AC power Pac2, generate a waveform having a component of amplitude of the calculated change amount as the correction waveform. The waveform generating units 63 and 63A corrects the ripple waveform by superimposing (adding) the correction waveform on the ripple waveform. Accordingly, the canceling waveform is corrected. Note that it is also possible to superimpose the correction waveform on the canceling waveform generated by the canceling waveform generating units 61 and 61A. The correction waveform in this case is a waveform obtained by inverting the correction waveform generated by the waveform generating units 63 and 63A.

Figure 9:
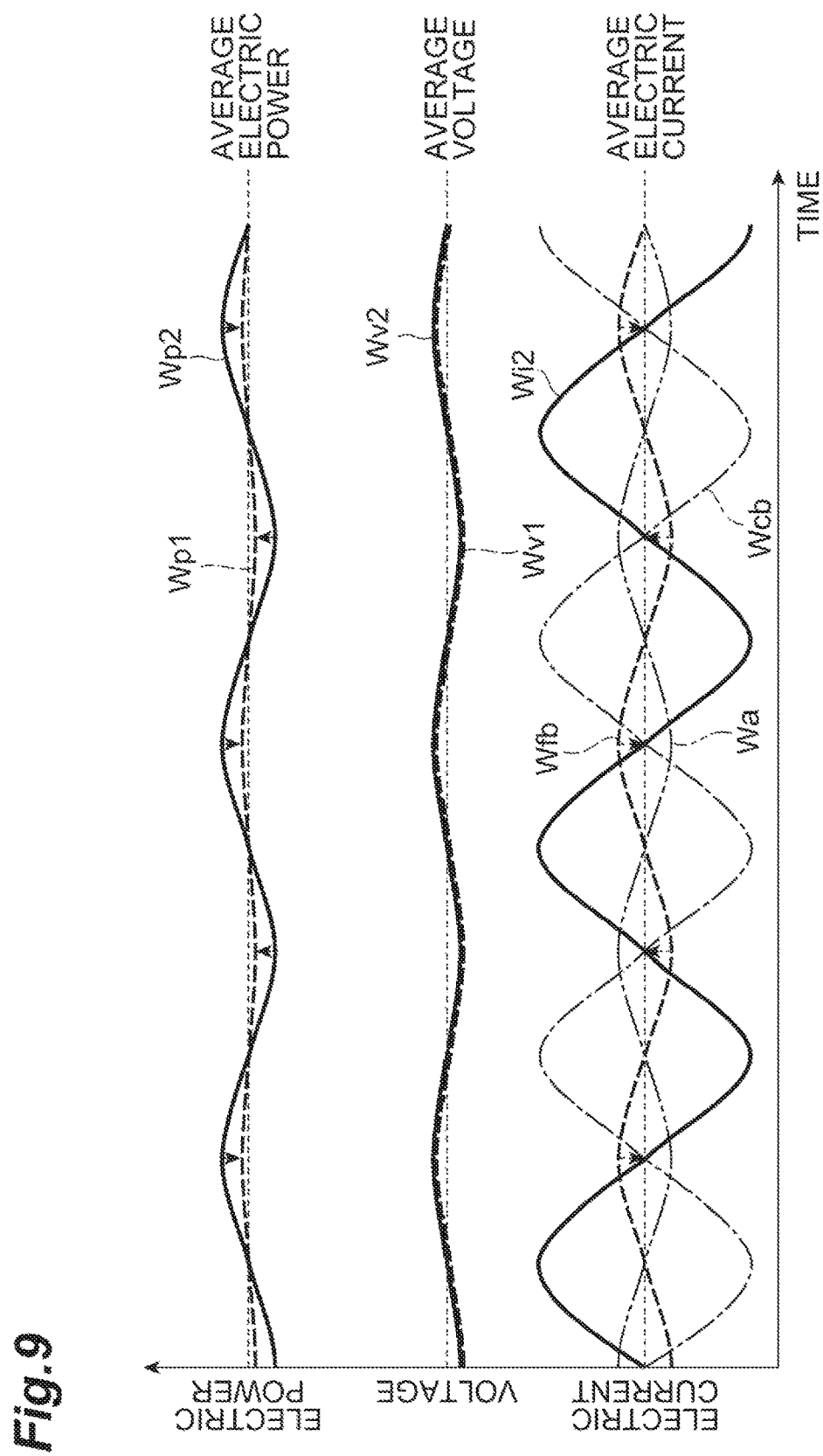
FIG. 9 is a graph for explaining operation of a wireless power transfer system according to a first modification.

FIG. 9 is a graph for explaining operation of the wireless power transfer system 1 according to the first modification.

The waveform Wp2, the waveform Wv2, and the waveform Wi2 are waveforms of the AC power Pac2, the voltage Vdc, and the current Idc, respectively, in a case where the conventional feedback control is performed. The waveform Wp1 and the waveform Wv1 are waveforms of the AC power Pac2 and the voltage Vdc, respectively, in a case where the first feedback control is performed. A waveform Wcb is a canceling waveform before correction, a waveform Wa is a correction waveform, and the waveform Wfb is a waveform of the FB signal. Here, a description is given using the FB signal generator 28.

As illustrated in FIG. 9, due to the zero crossing of the voltage Vac1, the ripple is generated to the current Idc, the voltage Vdc, and the AC power Pac2 (see the waveform Wi2, the waveform Wv2, and the waveform Wp2). The waveform generating unit 63 receives the measurement value of the current Idc from the current sensor 23i and uses the waveform of the measurement value of the current Idc as the ripple waveform. Further, the waveform generating unit 63 receives the synchronization information and the magnitude of the DC power Pdc from the first detector 23 and generates the correction waveform Wa. Then, the waveform generating unit 63 superimposes the correction waveform Wa on the ripple waveform and outputs it to the inverting unit 64. The inverting unit 64 inverts the waveform superimposed by the waveform generating unit 63 and outputs it to the combining unit 62 through the capacitor 65. Accordingly, the canceling waveform generating unit 61 generates the canceling waveform by extracting the AC component from the waveform that is obtained by superimposing the correction waveform Wa on the ripple waveform and by inverting the waveform.

Then, the combining unit 62 generates the FB signal (see the waveform Wfb) by superimposing the canceling waveform on the measurement value of the current Idc. Accordingly, the ripple is removed from the measurement value of the current Idc, and by using the FB signal to which a component for reducing the ripple caused to the AC power Pac2 is added, the first feedback control is performed. The ripple of the AC power Pac2 is caused at timing when the ripple is caused to the FB signal related to the current Idc. Since the timing at which the ripple is caused is the same between the FB signal and the AC power Pac2, when the power control is performed so as to reduce the ripple in the FB signal, the ripple of the AC power Pac2 is reduced. Therefore, the ripple caused to the AC power Pac2 due to the ripple of the voltage Vdc is reduced (see the waveform Wp1).

In this way, in the wireless power transfer system 1 and the power transmitter 2 according to the first modification, the canceling waveform is corrected by the correction waveform corresponding to the ripple caused to the voltage Vdc due to the zero crossing of the voltage Vac1 of the AC power Pac1, and the FB signal is generated. Based on the FB signal, the first feedback control of the electric power to be supplied to the power receiver 3 is performed, whereby it is possible to reduce the ripple of the AC power Pac2. As a result, it is possible to further reduce the ripple caused to the load current Iout due to the zero crossing of the voltage Vac1 of the AC power Pac1.

(Second Modification)

Figure 10:
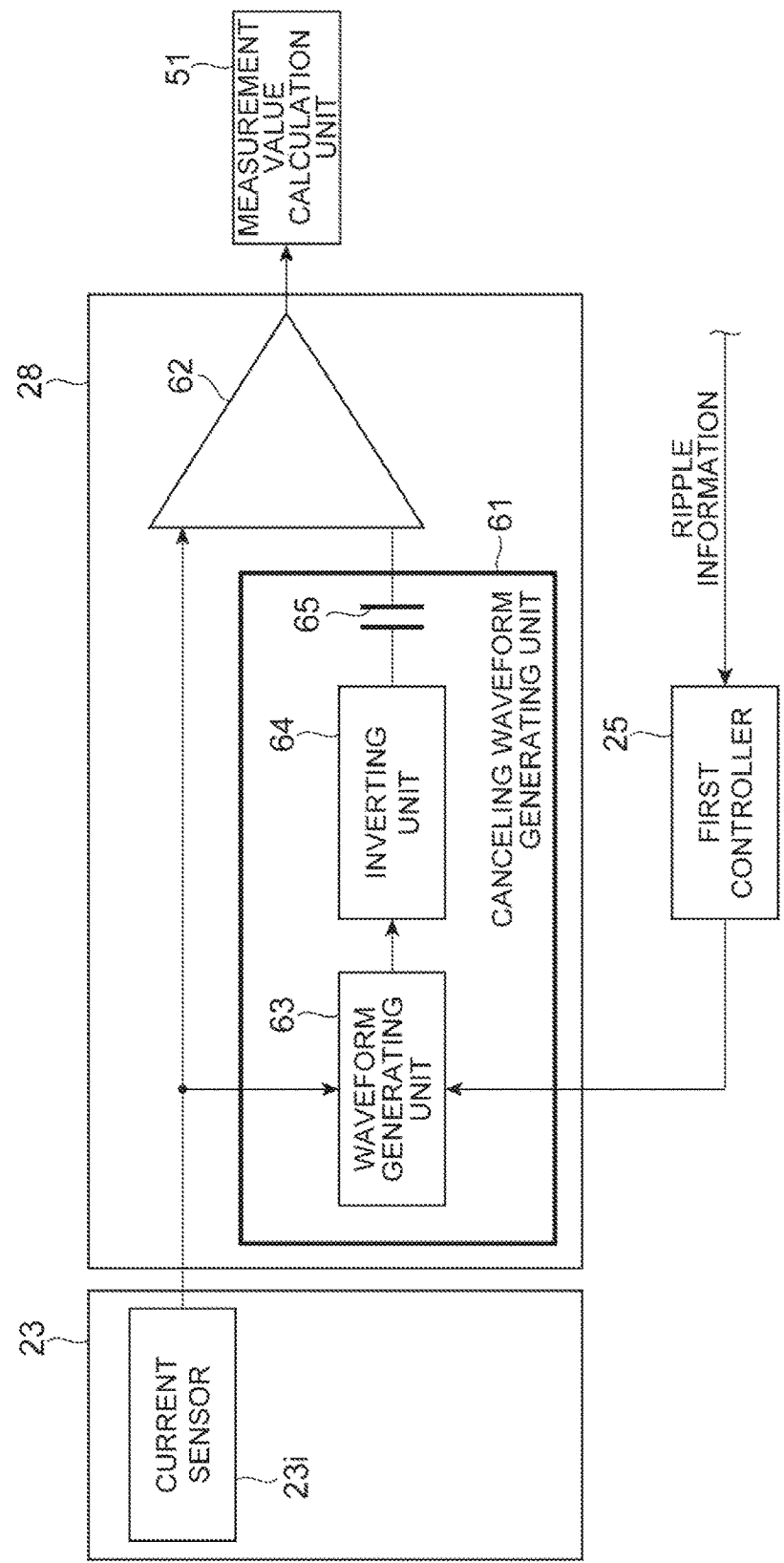
FIG. 10 is a block diagram illustrating a configuration of the first detector, the first controller, and the FB signal generator of a second modification of the wireless power transfer system according to the first embodiment.
Figure 11:
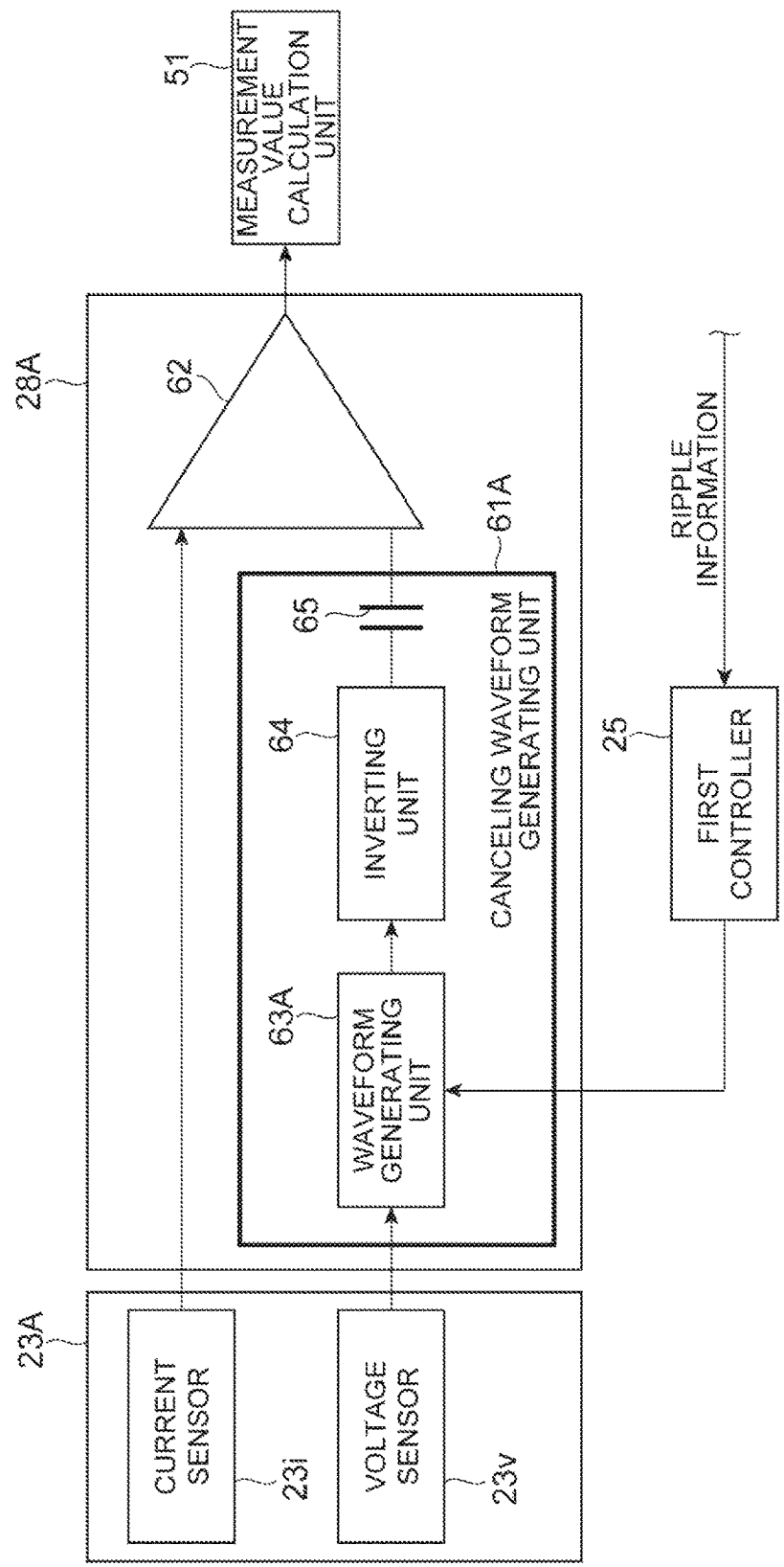
FIG. 11 is a block diagram illustrating a configuration of the first detector, a first controller, and the FB signal generator of a second modification of the wireless power transfer system according to the second embodiment.

In the wireless power transfer system 1 according to a second modification illustrated in FIGS. 10 and 11, the second controller 35 generates ripple information on a ripple of the load voltage Vout, the load current Iout, or the load power Pout that is measured by the second detector 33. The first controller 25 receives the ripple information from the second controller 35 through the second communication device 34 and the first communication device 24, and based on the ripple information, allows the FB signal generators 28 and 28A to correct the canceling waveform.

Specifically, the second controller 35 calculates the ripple amount of the load current Iout for each predetermined period from the load voltage Vout, the load current Iout, or the load power Pout measured by the second detector 33 and generates a combination of a phase or timing and the ripple amount as the ripple information. The ripple amount in the ripple information is a value obtained by subtracting a desired current amount from the current amount of the load current Iout. The predetermined period is set in advance to the second controller 35. Based on the ripple information, the first controller 25 determines whether or not the ripple amount of the load current Iout is equal to or smaller than an allowed value. The allowed value is determined in advance for the circuit of the wireless power transfer system 1 and for the load L, and it is a value having no influence on operation. In a case where it is determined that an absolute value of the ripple amount included in the ripple information is larger than the allowed value, the first controller 25 allows the FB signal generators 28 and 28A to correct the canceling waveform such that the absolute value of the ripple amount becomes small.

For example, in a case where the ripple amount included in the ripple information is a positive value, it is necessary to decrease the load current Iout. On the other hand, in a case where the ripple amount included in the ripple information is a negative value, it is necessary to increase the load current Iout. For this reason, the FB signal generators 28 and 28A adjust the magnitude of the AC power Pac2 by adjusting the amplitude or the phase of the canceling waveform. Correction of the canceling waveform based on the ripple information is performed, for example, by the waveform generating units 63 and 63A correcting the ripple waveform.

In this way, in the wireless power transfer system 1 and the power transmitter 2 according to the second modification, the canceling waveform is corrected corresponding to the waveform (ripple) of the load voltage Vout, the load current Iout, or the load power Pout that is actually supplied to the load L, and the FB signal is generated. Based on the FB signal, the first feedback control of the electric power to be supplied to the power receiver 3 is performed, whereby it is possible to more surely reduce the ripple caused to the load current Iout due to the zero crossing of the voltage Vac1 of the AC power Pac1.

It is also possible to implement both of the first and second modifications.

Third Embodiment

Figure 12:
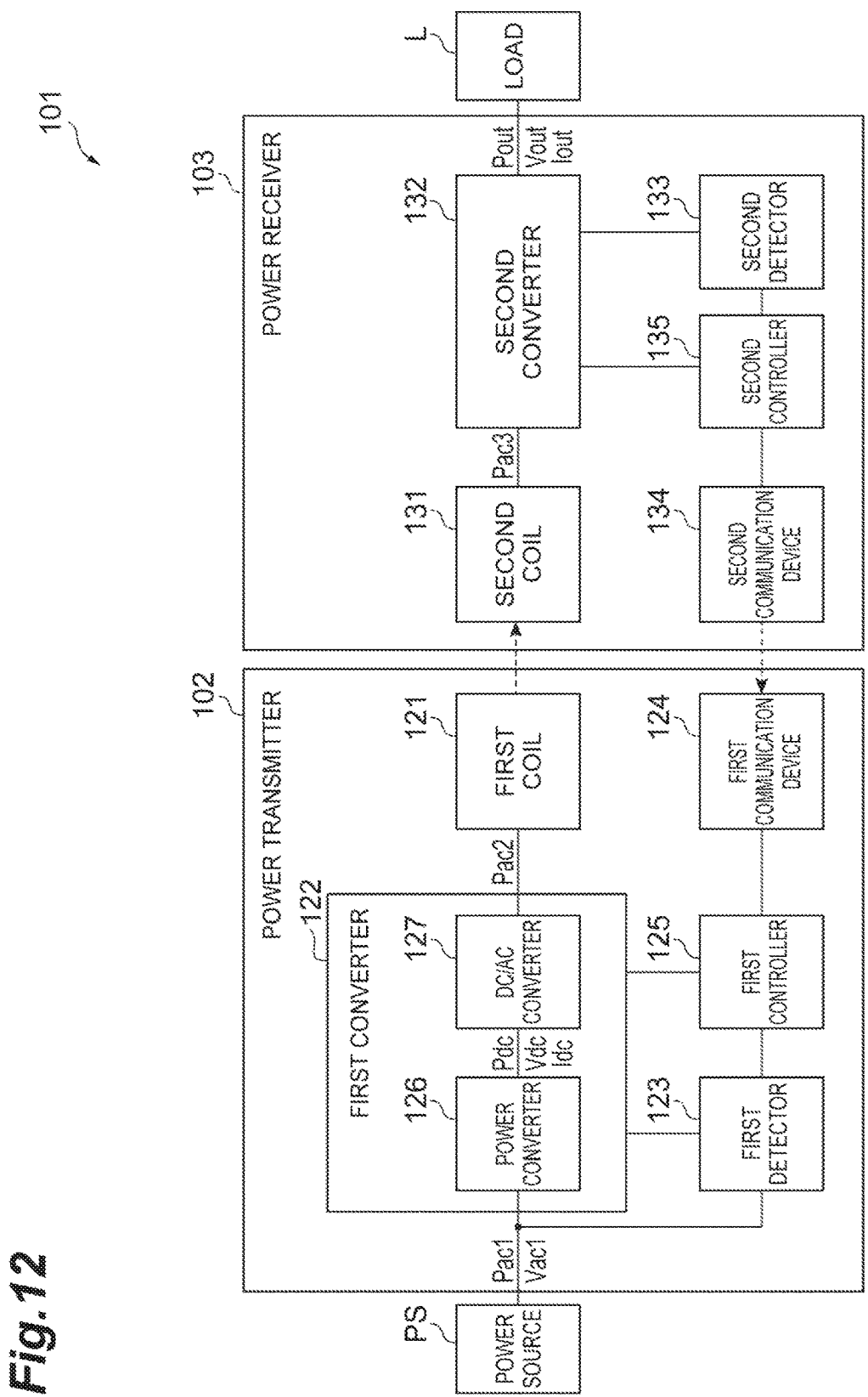
FIG. 12 is a circuit block diagram illustrating a wireless power transfer system according to a third embodiment.

With reference to FIG. 12, a circuit configuration of a wireless power transfer system 101 according to a third embodiment is described in detail. FIG. 12 is a circuit block diagram illustrating the wireless power transfer system 101 according to the third embodiment. As illustrated in FIG. 12, the wireless power transfer system 101 is a system which receives the AC power Pac1 (first AC power) from the power source PS and supplies the load power Pout to the load L. The power source PS is an AC power source such as a commercial power source, and it supplies the AC power Pac1 to a power transmitter 102. The frequency of the AC power Pac1 is, for example, 50 Hz or 60 Hz. The load L may be a DC load such as a battery or an AC load such as a motor.

The power transmitter 102 is supplied with the AC power Pac1 from the power source PS. The power transmitter 102 includes a first coil 121 (coil), a first converter 122 (converter), a first detector 123, a first communication device 124, and a first controller 125.

The first converter 122 is a circuit configured to convert the AC power Pac1 supplied from the power source PS into the desired AC power Pac2 (second AC power) and to supply the AC power Pac2 that has been converted to the first coil 121. The first converter 122 is capable of changing the magnitude of the AC power Pac2, for example, by the frequency control and the phase shift control described below. The first converter 122 includes a power converter 126 and a DC/AC converter 127.

The power converter 126 is the AC/DC converter configured to convert the AC power Pac1, which is supplied from the power source PS, into the DC power Pdc. The power converter 126 is, for example, a rectifier circuit. The rectifier circuit may be constituted of a rectifying element such as a diode or may be constituted of a switching element such as a transistor. The power converter 126 may further have the power factor correction (PFC) function and the step-up and step-down functions. The power converter 126 is controlled by the first controller 125 so as to change the magnitude of the voltage Vdc of the DC power Pdc. The power converter 126 changes the magnitude of the voltage Vdc of the DC power Pdc, for example, by the pulse width modulation. The power converter 126 supplies the DC power Pdc that has been converted to the DC/AC converter 127.

The DC/AC converter 127 converts the DC power Pdc, which has been converted by the power converter 126, into the AC power Pac2. A frequency of the AC power Pac2 is, for example, 81.38 kHz to 90 kHz. The DC/AC converter 127 is, for example, an inverter circuit. The first converter 122 may further include a transformer provided to an output of the DC/AC converter 127. The DC/AC converter 127 is controlled by the first controller 125 so as to change the magnitude of the AC power Pac2. The DC/AC converter 127 supplies the AC power Pac2 that has been converted to the first coil 121.

The first coil 121 is a coil for wirelessly feeding the electric power to a power receiver 103. The first coil 121 generates a magnetic flux as it is supplied with the AC power Pac2 from the first converter 122. Between the first coil 121 and the first converter 122, a capacitor and an inductor (for example, a reactor) may be connected.

The first detector 123 includes a circuit for detecting the zero crossing timing of the voltage Vac1 of the AC power Pac1 that is supplied from the power source PS. The zero crossing timing of the voltage Vac1 of the AC power Pac1 refers to timing at which the voltage value of the voltage Vac1 of the AC power Pac1 is switched from a positive value to a negative value or from a negative value to a positive value. That is, the zero crossing timing of the voltage Vac1 of the AC power Pac1 refers to timing at which the voltage value of the voltage Vac1 is 0 V. Specifically, the first detector 123 detects the zero crossing timing of the voltage Vac1 of the AC power Pac1 based on the voltage value of the voltage Vac1 of the AC power Pac1. The first detector 123 includes a voltage sensor configured to measure the voltage Vac1 of the AC power Pac1. The first detector 123 decreases the voltage Vac1 through a resistance element (not illustrated) and, by monitoring the decreased voltage, detects the zero crossing timing. The first detector 123 outputs the synchronization information indicating the zero crossing timing to the first controller 125. As the synchronization information, the first detector 123 outputs, for example, a pulse signal at timing when the voltage value of the voltage Vac1 of the AC power Pac1 becomes 0 V.

The first detector 123 includes a circuit for obtaining a measurement value related to the DC power Pdc. The circuit for obtaining the measurement value related to the DC power Pdc is, for example, a voltage sensor, a current sensor, or a combination thereof. The first detector 123 measures the DC power Pdc, the voltage Vdc of the DC power Pdc, or the current Idc of the DC power Pdc. The first detector 123 outputs the obtained measurement value to the first controller 125.

The first communication device 124 is a circuit for wirelessly communicating with a second communication device 134 of the power receiver 103 described below. The first communication device 124 is, for example, an antenna for a communication method using radio waves or a light-emitting element and a light-receiving element for a communication method using optical signals. The first communication device 124 outputs information received from the power receiver 103 to the first controller 125.

The first controller 125 is a processing device such as a central processing unit (CPU) and a digital signal processor (DSP). The first controller 125 may also include a read only memory (ROM), a random access memory (RAM), an interface circuit for connecting with each unit of the power transmitter 102, and the like. By controlling the first converter 122, the first controller 125 performs power control in which the magnitude of the AC power Pac2 is controlled and the magnitude of the load power Pout that is supplied to the load L is controlled. The power control is performed by using at least one of the frequency control and the phase shift control. In each of the controls, the parameter for controlling the magnitude of the AC power Pac2 is changed.

Figure 13:
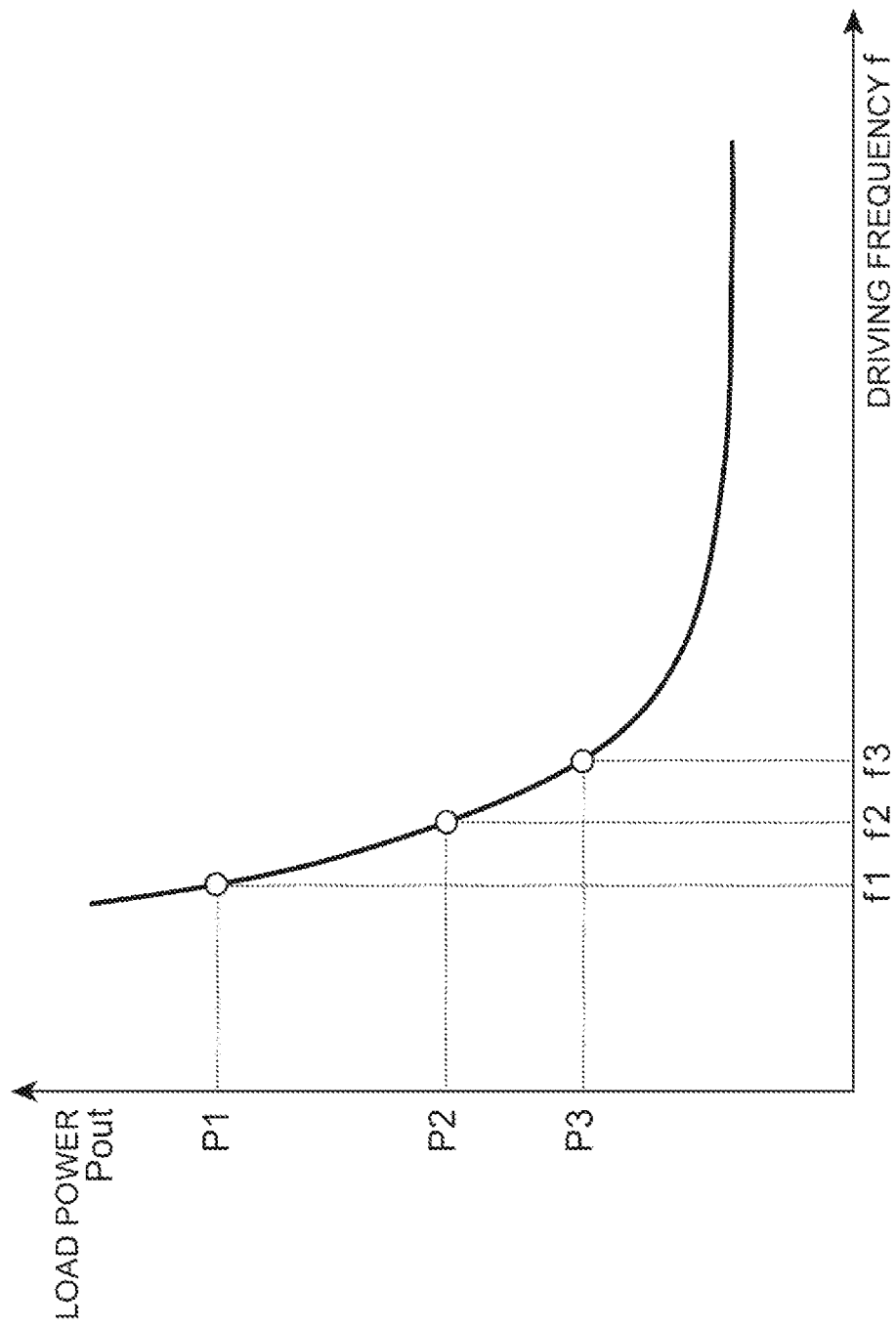
FIG. 13 is a graph illustrating a frequency characteristic of a load power.

Now, the frequency control is described using FIG. 13. A horizontal axis of a graph in FIG. 13 indicates the driving frequency f, and a vertical axis thereof indicates (the magnitude of) the load power Pout. The driving frequency f is the frequency of the AC power Pac2. As illustrated in FIG. 13, the magnitude of the AC power Pac2 and the load power Pout changes with the driving frequency f. As the driving frequency f, for example, 81.38 kHz to 90 kHz are available. As the frequency is changed, an impedance of a reactance element such as the coil and the capacitor is changed, whereby the magnitude of the AC power Pac2 and the load power Pout is changed. Hereinafter, in this embodiment, as the frequency increases, the magnitude of the AC power Pac2 and the load power Pout decreases. The first controller 125 performs the frequency control that changes the magnitude of the AC power Pac2 and the load power Pout by changing the driving frequency f. In the frequency control, the above-described parameter is the driving frequency f. The frequency of the AC power Pac2 refers to a frequency of the alternating current or the AC voltage that is output from the first converter 122.

For example, it is assumed that the driving frequency f is initially a frequency f2. The load power Pout at this time is an electric power P2. Here, for example, the driving frequency f is reduced from the frequency f2 to a frequency f1. Then, the load power Pout becomes an electric power P1 corresponding to the driving frequency f=f1. Therefore, the load power Pout increases from the electric power P2 to the electric power P1. On the other hand, the driving frequency f is increased from the frequency f2 to a frequency f3. Then, the load power Pout becomes an electric power P3 corresponding to the driving frequency f=f3. Therefore, the load power Pout decreases from the electric power P2 to the electric power P3.

The first controller 125 brings the load power Pout closer to a desirable electric power by controlling the driving frequency f as described above. In the control that actually changes (increases and decreases) the driving frequency f, the driving frequency f may be changed by steps. The size of one step for changing the driving frequency f is not particularly limited, and may be, for example, about several hertz to several tens of hertz or several tens of hertz to several hundreds of hertz. The size of one step may be determined, for example, by a clock resolution of the CPU, which is the first controller 125.

A specific procedure of the frequency control is not limited. For example, in a case where the DC/AC converter 127 is an inverter circuit, the first controller 125 adjusts the switching frequency of each switching element using the driving signal that is supplied to each of the switching elements included in the inverter circuit to change the driving frequency f. The switching element refers to, for example, a field effect transistor (FET), an insulated gate bipolar transistor (IGBT), and the like, and in this case, the driving signal is applied to a gate of the switching element.

Figure 14:
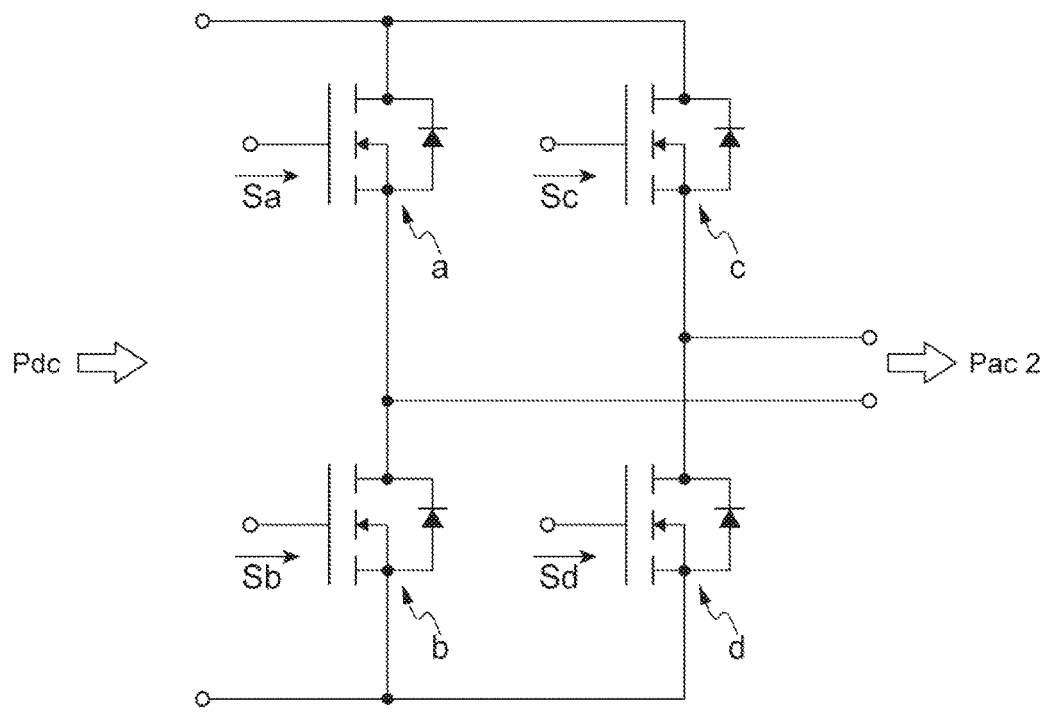
FIG. 14 is a diagram illustrating an example of a circuit configuration of a DC/AC converter.

The phase shift control is described. For example, in a case where the DC/AC converter 127 is an inverter circuit as illustrated in FIG. 14, the first controller 125 adjusts a time during which each of the switching elements a to d is turned on by adjusting a supply time of driving signals Sa to Sd for switching elements a to d included in the inverter circuit. When a driving time of the switching element a and a driving time of the switching element d is the same and a driving time of the switching element b and a driving time of the switching element c are the same, a conduction period (ON period) of the inverter circuit is the longest. The more the driving time of the switching element a and the driving time of the switching element d are shifted (the more the driving time of the switching element b and the driving time of the switching element c are shifted), the shorter the ON period of the inverter circuit becomes. As the ON period of the inverter circuit becomes shorter, the AC power Pac1 becomes smaller. In the phase shift control, the above-described parameter is an amount of shift between the driving time of the switching element a and the driving time of the switching element d (or an amount of shift between the driving time of the switching element b and the driving time of the switching element c). In other words, in the phase shift control, the above-described parameter is the ON period of the inverter circuit.

Note that in order to achieve soft switching of the inverter circuit, it is necessary that a phase of an output voltage (voltage of the AC power Pac2) from an inverter circuit is the same as or is ahead of a phase of an output current (current of the AC power Pac2) (impedance is inductive). When a phase difference is the same between the voltage and the current, the impedance becomes capacitive due to noise, a control error, and the like. Therefore, the phase of the voltage is put ahead of the phase of the current by a predetermined value in order to ensure safety. This predetermined value is referred to as a phase margin.

The phase difference may be expressed, for example, in a percentage in which a length of one cycle of the AC power Pac2 (that is, 360 degrees) is 100%. In this case, in a state where a phase shift is not performed at all, a phase shift value is 0%. Note that in the phase shift control, the AC power Pac2 is at the maximum when the phase shift value is 0%, and the load power Pout is also at the maximum. A maximum value of the phase shift value varies with a circuit characteristic of the first coil 121 (for example, a characteristic of a resonant circuit including the first coil 121 and a capacitor that is not illustrated), and it is about 50%, for example. That is, in one aspect, a lower limit value of the phase difference may be set to 0%. An upper limit value of the phase difference may be set to 50%.

The first controller 125 controls the first converter 122, as a power control, based on the measurement value and a power command value (described below) related to the load power Pout received from the power receiver 103 through the first communication device 124 so as to bring the load power Pout closer to the power command value. Further, the first controller 125 controls the first converter 122, as a power control, such that the magnitude of the AC power Pac2 is increased during a predetermined period from the zero crossing timing of the voltage Vac1 of the AC power Pac1 supplied from the power source PS to reduce the ripple caused to the load current Iout of the load power Pout. Details of a method for reducing the ripple is described below.

The power receiver 103 includes a second coil 131, a second converter 132, a second detector 133 (detector), the second communication device 134, and a second controller 135.

The second coil 131 is a coil for receiving the electric power wirelessly supplied from the power transmitter 102. By the magnetic flux, which is generated by the first coil 121, interlinking with the second coil 131, the AC power Pac3 is generated in the second coil 131. The second coil 131 supplies the AC power Pac3 to the second converter 132. Note that between the second coil 131 and the second converter 132, a capacitor and an inductor (for example, a reactor) may be connected.

The second converter 132 is a circuit configured to convert the AC power Pac3 received from the second coil 131 into the load power Pout desirable for the load L. In a case where the load L is a DC load, the second converter 132 is the AC/DC converter (rectifier circuit) configured to convert the AC power Pac3 into the DC load power Pout. In this case, the second converter 132 may include the step-up and step-down functions to output the load power Pout desirable for the load L. The step-up and step-down functions may be achieved, for example, by a chopper circuit or a transformer. The second converter 132 may further include a transformer that is provided to an input of the AC/DC converter.

In a case where the load L is an AC load, the second converter 132 further includes the DC/AC converter (inverter circuit) in addition to the AC/DC converter configured to convert the AC power Pac3 into the DC power. The DC/AC converter converts the DC power converted by the AC/DC converter into the AC load power Pout. The second converter 132 may further include a transformer that is provided to the input of the AC/DC converter. Note that in a case where the AC power Pac3 supplied from the second coil 131 is the AC power desirable for the load L, the second converter 132 may be omitted.

The second detector 133 is a circuit for obtaining a measurement value related to the load power Pout that is supplied to the load L. The second detector 133 measures the load voltage Vout, the load current Iout, or the load power Pout that is supplied to the load L. The second detector 133 is, for example, a voltage sensor, a current sensor, or a combination thereof. The second detector 133 outputs the obtained measurement value to the second controller 135. The load L outputs the power command value to the second controller 135. The power command value indicates a magnitude of desirable electric power to be supplied to the load L. For example, in a case where the load L is a storage battery, the power command value may be a command value of current, voltage, or electric power determined according to the state of charge (SOC) of the load L.

The second communication device 134 is a circuit for wirelessly communicating with the first communication device 124 of the power transmitter 102. Through the second communication device 134, the power receiver 103 is capable of communicating with the power transmitter 102. The second communication device 134 is, for example, an antenna for a communication method using radio waves or a light-emitting element and a light-receiving element for a communication method using optical signals. The second communication device 134 transmits information received from the second controller 135 to the power transmitter 102.

The second controller 135 is a processing device such as a CPU and a DSP. The second controller 135 may include a ROM, a RAM, an interface circuit for connecting with each unit of the power receiver 103, and the like. The second controller 135 transmits the measurement value received from the second detector 133 and the power command value received from the load L to the power transmitter 102 through the second communication device 134.

Note that for example, by connecting the power transmitter 102 to a storage battery of an electric vehicle in place of the power source PS and by connecting the power receiver 103 to the power source PS in place of the load L, it is also possible to transmit the electric power from the power receiver 103 to the power transmitter 102.

Next, a method for reducing the ripple of the load current Iout is specifically described. First, the first controller 125 estimates the ripple amount of the load current Iout based on the zero crossing of the voltage Vac1. The ripple amount of the load current Iout based on the zero crossing of the voltage Vac1 refers to a difference between a maximum value and a minimum value of a current value of the load current Iout. Note that the load current Iout may also include the ripple due to the frequency component of the driving frequency f and noise. Therefore, it is also possible to provide a low pass filter (not illustrated) between the second converter 132 and the load L. In this case, output from the low pass filter is the load current Iout.

Specifically, the first controller 125 includes, for example, a second conversion table indicating a relationship between the magnitude of the DC power Pdc and the ripple amount of the load current Iout. In the second conversion table, the ripple amount of the load current Iout is associated with various magnitudes of the DC power Pdc. The second conversion table is obtained in advance through an experiment and the like and is set to the first controller 125. Using the second conversion table, the first controller 125 estimates the ripple amount from the magnitude of the DC power Pdc detected by the first detector 123. Specifically, the first controller 125 obtains the ripple amount associated with the magnitude of the DC power Pdc that has been detected from the second conversion table.

Note that the second conversion table may also be information indicating a relationship between the magnitude of the AC power Pac2 and the ripple amount of the load current Iout, and the first controller 125 may estimate the ripple amount of the load current Iout from the magnitude of the AC power Pac2. Further, the second conversion table may also be information indicating a relationship between the magnitude of the voltage Vdc or the current Idc and the ripple amount of the load current Iout, and the first controller 125 may estimate the ripple amount of the load current Iout from the magnitude of the voltage Vdc or the current Idc.

The first controller 125, using at least any of the frequency control and the phase shift control, calculates a change amount of the parameter for controlling the magnitude of the AC power Pac2 to reduce the ripple of the load current Iout.

For example, in a case where the frequency control is used, the first controller 125 calculates a change amount of the driving frequency f as the parameter for controlling the magnitude of the AC power Pac2. In this case, the first controller 125 includes a second characteristic table indicating a relationship between the change amount of the driving frequency f and a variation of the load current Iout. In the second characteristic table, the change amount of the driving frequency f is associated with the variation of the load current Iout. The second characteristic table is obtained in advance through an experiment and the like and is set to the first controller 125. Using the second characteristic table, the first controller 125 calculates the change amount of the driving frequency f. Specifically, the first controller 125 calculates, from the second characteristic table, the change amount of the driving frequency f that is required for increasing a magnitude of the load current Iout by the ripple amount (reduced amount) of the load current Iout. Since the change amount of the driving frequency f required may be different depending on the current driving frequency f, the second characteristic table may be provided for each of the driving frequencies f, provided for each of the frequencies of the power source PS (for example, 50 Hz or 60 Hz), or provided for each of the voltage values of the power source PS (for example, 200 V or 240 V). Further, according to a variation of the voltage values of the power source PS, a value of the second characteristic table may be corrected as well.

In a case where the phase shift control is used, the first controller 125 calculates, for example, a change amount of the ON period of the inverter circuit as the parameter for controlling the magnitude of the AC power Pac2. In this case, in the second characteristic table, the change amount of the ON period of the inverter circuit is associated with the variation of the load current Iout. In the same way as in the frequency control, the first controller 125 calculates the change amount of the ON period of the inverter circuit using the second characteristic table.

The first controller 125 controls the first converter 122 using the change amount of the calculated parameter based on the synchronization information received from the first detector 123 to change the magnitude of the AC power Pac2. Specifically, according to a fluctuation of the voltage Vdc based on the zero crossing timing of the voltage Vac1 of the AC power Pac1, the current amount of the load current Iout is changed, and the ripple is caused to the load current Iout. For this reason, the first controller 125 changes the parameter only by the calculated change amount based on the timing indicated by the synchronization information such that the ripple of the load current Iout is reduced. The first controller 125 continuously changes the parameter, for example, based on the timing indicated by the synchronization information. Further, the first controller 125 may change the parameter stepwise based on the timing indicated by the synchronization information. In this case, the first controller 125 may change the parameter only by the calculated change amount during a predetermined period including the timing indicated by the synchronization information and may restore it to an original state after the predetermined period has passed. The predetermined period refers to a period in which the current amount of the load current Iout is decreased due to the zero crossing of the voltage Vac1. The predetermined period is obtained in advance through an experiment and the like and is set to the first controller 125. In this way, the wireless power transfer system 101 reduces the ripple due to the zero crossing of the voltage Vac1 of the AC power Pac1.

Next, with reference to FIGS. 15 and 16, a function and an effect of the wireless power transfer system 101 are described. FIGS. 15 and 16 are graphs for explaining operation of the wireless power transfer system 101. Note that, for convenience of explanation, a waveform illustrated in FIGS. 15 and 16 is indicated by exaggerating a fluctuation part and may be different from an actual waveform. The AC power Pac1 is supplied from the power source PS to the power transmitter 102. As illustrated in FIG. 15(*a*), the waveform of the voltage Vac1 of the AC power Pac1 is a sine wave. The voltage value of the voltage Vac1 becomes a negative value from a positive value at times t1, t3, and t5 and becomes a positive value from a negative value at times t2 and t4. Therefore, the times t1, t2, t3, t4, and t5 are the zero crossing timings (zero crossing points).

In the power transmitter 102, first, the power converter 126 of the first converter 122 performs a full-wave rectification on the AC power Pac1 supplied from the power source PS. Accordingly, as illustrated in FIG. 15(*b*), a voltage waveform after rectification is obtained. Then, the power converter 126 generates the DC power Pdc using the PFC function and the step-up and step-down functions, and supplies the DC power Pdc to the DC/AC converter 127. The voltage waveform of the DC power Pdc generated in this way becomes a waveform as illustrated in FIG. 15(*c*). In this way, near the zero crossing timing (times t1, t2, t3, t4, and t5), the voltage value of the voltage Vdc may drop by several volts due to the zero crossing of the voltage Vac1. Note that depending on characteristics of the PFC, near the zero crossing timing (times t1, t2, t3, t4, and t5), the voltage value of the voltage Vdc may also be increased by several volts due to the zero crossing of the voltage Vac1. In this example, however, it is assumed that the voltage value of the voltage Vdc is decreased by several volts due to the zero crossing of the voltage Vac1 during a period from the zero crossing timing (times t1, t2, t3, t4, and t5) until a predetermined time Δt is elapsed. Note, however, that in a case where the power converter 126 has the PFC function, an actual waveform becomes a waveform similar to the sine wave.

In this state, when wireless power transfer is performed by the DC/AC converter 127 converting the DC power Pdc into the AC power Pac2 and by supplying the AC power Pac2 that has been converted to the first coil 121, during the period in which the voltage Vdc of the DC power Pdc is decreased, a magnitude of the electric power of the AC power Pac2 is decreased, and a magnitude of the AC power Pac3 caused to the second coil 131 is also reduced accordingly. Then, the second converter 132 converts the AC power Pac3 into the load power Pout, whereby as illustrated in FIG. 16(*b*), during each of the periods from the zero crossing timing (times t1, t2, t3, t4, and t5) until the predetermined time Δt is elapsed, the current value of the load current Iout of the load power Pout is decreased periodically. The ripple, which is a periodic fluctuation of the current, is due to the zero crossing of the voltage Vac1. In the power converter 126, since the full-wave rectification is performed on the AC power Pac1, the ripple caused to the load current Iout has a frequency component twice the frequency of the AC power Pac1. It is difficult to remove the ripple having such frequency component by the low pass filter and the like.

In contrast, in the wireless power transfer system 101, by controlling so as to increase the magnitude of the AC power Pac2 during the period in which the voltage Vdc is decreased, it is possible to reduce the ripple of the load current Iout. Specifically, the first detector 123 detects the zero crossing timing of the voltage Vac1 of the AC power Pac1 and outputs the synchronization information indicating the zero crossing timing to the first controller 125. Further, the first detector 123 measures the magnitude of the DC power Pdc and outputs a measurement value to the first controller 125. Then, the first controller 125, using the above-described second conversion table, estimates the ripple amount of the load current Iout from the magnitude of the DC power Pdc detected by the first detector 123. Then, the first controller 125, using at least any of the frequency control and the phase shift control, calculates the change amount of the parameter for controlling the magnitude of the AC power Pac2 to reduce the ripple of the load current Iout. For example, in a case where the frequency control is used, using the above-described second characteristic table, the first controller 125 calculates the change amount of the driving frequency f to reduce the estimated ripple amount.

As illustrated in FIG. 13, in a case where the driving frequency f is reduced, the load power Pout is increased, whereby the load current Iout may also be increased. For this reason, the first controller 125 specifies the zero crossing timing of the voltage Vac1 of the AC power Pac1 based on the synchronization information received from the first detector 123, changes the driving frequency f only by the calculated change amount based on the zero crossing timing, and restores the driving frequency f to the original state. Changing of the driving frequency f may be carried out consecutively or may be performed stepwise. In the waveform illustrated in FIG. 15(*d*), since the driving frequency f is decreased during the period in which the voltage Vdc is decreased, a time change of the driving frequency f and a time change of the voltage Vdc are the same. Accordingly, as illustrated in FIG. 16(*a*), the ripple of the load current Iout due to the zero crossing of the voltage Vac1 is cancelled. In this way, in the wireless power transfer system 101, it is possible to reduce the ripple due to the zero crossing of the voltage Vac1 of the AC power Pac1.

According to the wireless power transfer system 101 and the power transmitter 102 described above, based on the zero crossing timing of the voltage Vac1 of the AC power Pac1, the control is performed such that the magnitude of the AC power Pac2 obtained by converting the AC power Pac1 is changed. When the magnitude of the AC power Pac2 is increased, the magnitude of the load power Pout supplied to the load L may also be increased in the power receiver 103, and the current amount of the load current Iout supplied to the load L may also be increased. Further, when the magnitude of the AC power Pac2 is decreased, the magnitude of the load power Pout supplied to the load L may also be decreased in the power receiver 103, and the current amount of the load current Iout supplied to the load L may also be decreased. Therefore, even when the current amount of the load current Iout is temporarily fluctuated (increased or decreased) due to the zero crossing of the voltage Vac1 of the AC power Pac1, the current amount of the load current Iout may be changed (increased or decreased) based on the zero crossing timing of the voltage Vac1 of the AC power Pac1, whereby it is possible to reduce the ripple due to the zero crossing of the voltage Vac1 of the AC power Pac1.

The first converter 122 includes the power converter 126 configured to convert the AC power Pac1 into the DC power Pdc, and the DC/AC converter 127 configured to convert the DC power Pdc into the AC power Pac2. Therefore, the AC power Pac1 is once converted into the DC power Pdc, and the DC power Pdc is converted into the AC power Pac2.

In the above-described embodiment, by decreasing the frequency of the AC power Pac2 using the frequency control of the AC power Pac2, it is possible to increase the magnitude of the AC power Pac2 and to increase the magnitude of the load power Pout (current amount of the load current Iout). Similarly, by increasing the frequency of the AC power Pac2, it is possible to reduce the magnitude of the AC power Pac2 and to reduce the magnitude of the load power Pout (current amount of the load current Iout). For example, in a case where the DC/AC converter 127 is an inverter circuit, the first controller 125 adjusts the switching frequency of each switching element using the driving signal that is supplied to each of the switching elements included in the inverter circuit to change the frequency of the AC power Pac2. In this way, responsiveness is superior in a case where the magnitude of the AC power Pac2 is controlled by the frequency control of the AC power Pac2. Further, in the phase shift control of the AC power Pac2, the control is performed upon securing the phase margin of the current. For this reason, in the frequency control of the AC power Pac2, an adjustment range of the load power Pout (load current Iout) is larger than that in the phase shift control of the AC power Pac2. Therefore, it is possible to improve the responsiveness of the control of the magnitude of the AC power Pac2 and to more surely reduce the ripple caused due to the zero crossing of the voltage Vac1 of the AC power Pac1.

For example, in a case where the DC/AC converter 127 is an inverter circuit, the first controller 125 is capable of controlling the AC power Pac2 by adjusting a switching timing of each of the switching elements to change the ON period of the inverter circuit using the driving signal supplied to each of the switching elements included in the inverter circuit.

The first detector 123 directly detects the zero crossing timing from the voltage Vac1 of the AC power Pac1, whereby it is possible to surely detect the zero crossing timing. As a result, it is possible to more surely reduce the ripple caused due to the zero crossing of the voltage Vac1 of the AC power Pac1.

Further, in the second conversion table, a relationship between the magnitude of the DC power Pdc and the ripple amount of the load power Pout is set in advance. For this reason, it is possible to estimate the ripple amount of the load current Iout from the magnitude of the DC power Pdc. Accordingly, it is not necessary to obtain information related to the load power Pout from the power receiver 103 through the first communication device 124, and it is possible to perform a ripple reduction processing by the power transmitter 102 only. As a result, it is possible to shorten a processing time.

Note that it is also possible to attempt to reduce the ripple of the voltage Vdc of the DC power Pdc by providing a large-capacity capacitor to a downstream of the power converter 126. Further, it is possible to reduce an effect of a voltage drop of the voltage Vdc of the DC power Pdc by providing a DC/DC converter to the downstream of the power converter 126 or to the power receiver 103. Further, it is also possible to add a low pass filter, a choke coil, and the like to the power receiver 103. However, in a case where the large-capacity capacitor is added, there are problems such as a cost increase, an increase of an installation area, and a longer time required for starting and stopping the power converter 126. There are similar problems in a case where the DC/DC converter, the low pass filter, or the choke coil is added. In contrast, in the wireless power transfer system 101, since the ripple has been reduced through the control, it is possible to reduce a size of the power transmitter 102 as well as to suppress the cost increase.

Fourth Embodiment

Figure 17:
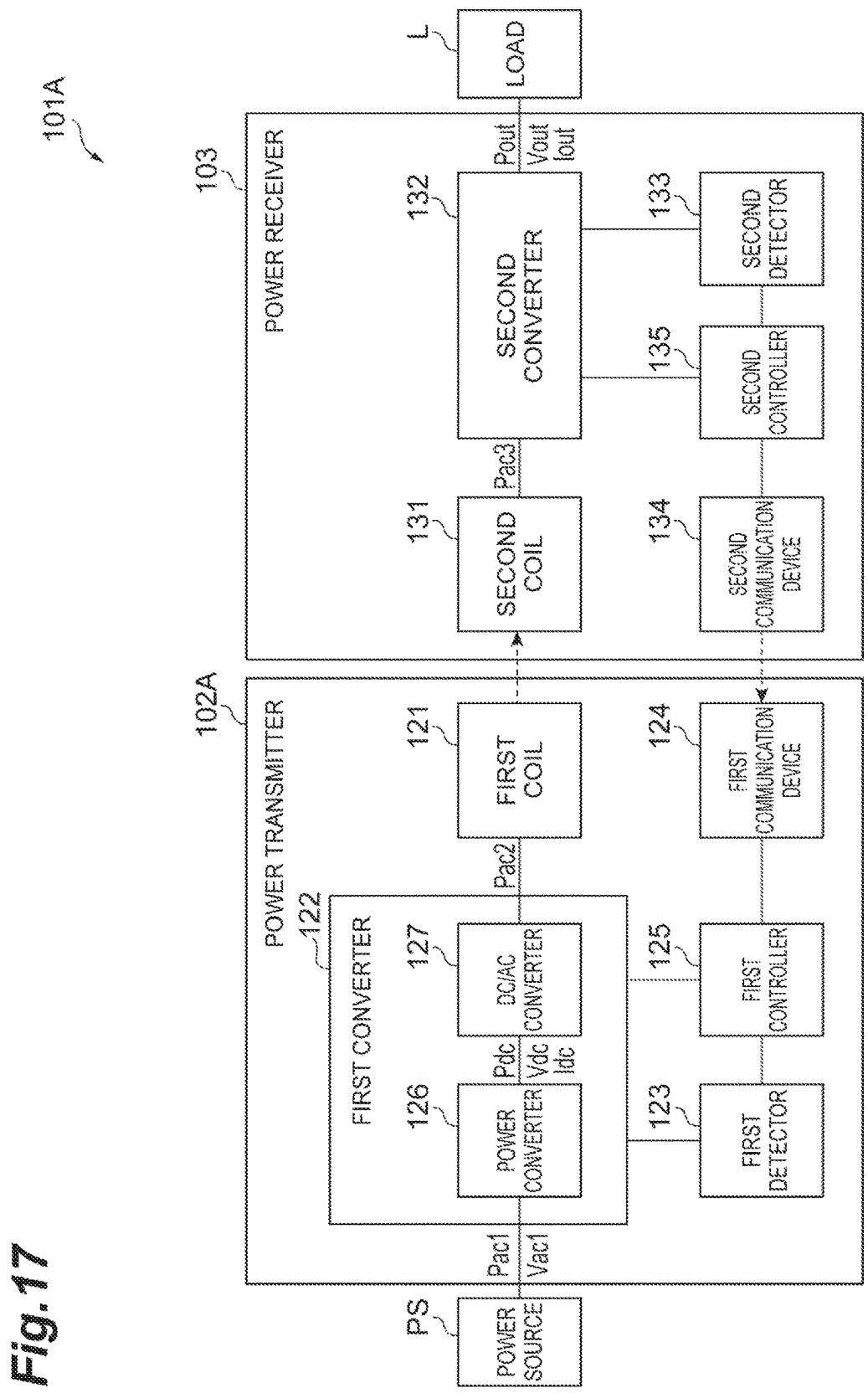
FIG. 17 is a circuit block diagram illustrating a wireless power transfer system according to a fourth embodiment.

With reference to FIG. 17, a circuit configuration of a wireless power transfer system 101A according to a fourth embodiment is described in detail. FIG. 17 is a circuit block diagram illustrating the wireless power transfer system 101A according to the fourth embodiment. As illustrated in FIG. 17, compared to the wireless power transfer system 101, the wireless power transfer system 101A is different in that it includes a power transmitter 102A in place of the power transmitter 102. The power transmitter 102A, compared to the power transmitter 102, is different in a method for detecting the zero crossing.

More specifically, in the power transmitter 102A, the first controller 125 detects the zero crossing timing based on the output of the power converter 126. That is, the first detector 123 according to the fourth embodiment does not output the synchronization information to the first controller 125, whereby the first controller 125 detects the zero crossing timing based on the DC power Pdc, the voltage Vdc of the DC power Pdc, or the current Idc of the DC power Pdc measured by the first detector 123. According to the zero crossing timing of the voltage Vac1 of the AC power Pac1, the magnitude of the output of the power converter 126 (the DC power Pdc, the voltage Vdc, and the current Idc) is decreased, whereby the first controller 125 detects, for example, timing at which the voltage value of the voltage Vdc starts to decrease as the zero crossing timing.

As described above, in the wireless power transfer system 101A and the power transmitter 102A as well, the same effect as that of the wireless power transfer system 101 and the power transmitter 102 is achieved. Further, in the wireless power transfer system 101A and the power transmitter 102A, the first controller 125 detects the zero crossing timing based on the output of the power converter 126 (the DC power Pdc, the voltage Vdc, or the current Idc). For this reason, compared to the wireless power transfer system 101 and the power transmitter 102, a sensor for detecting a voltage of the voltage Vac1 is unnecessary, whereby it is possible to simplify the configuration.

As described above, the third and fourth embodiments of the disclosure have been described; however, the present invention is not limited to the above embodiments. For example, the wireless power transfer systems 101 and 101A are applicable not only to the electric vehicle EV but also to a movable object such as a plug-in hybrid vehicle and an underwater sailing body as well as a non-movable object.

In the above embodiment, the first controller 125 performs the feedback control on the first converter 122 based on the measurement value and the power command value received from the power receiver 103 so as to bring the load power Pout closer to the power command value; however, the first controller 125 may also perform the feedback control on the first converter 122 based on information from the first converter 122 in addition to from the power receiver 103 so as to bring the load power Pout closer to the power command value.

In the above embodiments, the first controller 125 is provided with the second conversion table for estimating the ripple amount of the load current Iout from the DC power Pdc, and the second characteristic table for calculating the change amount of the parameter from the estimated ripple amount. Instead of these tables, the first controller 125 may also be provided with a table indicating a relationship between the magnitude of the DC power Pdc and the change amount of the parameter. In this case, the first controller 125 is capable of directly calculating the change amount of the parameter for controlling the magnitude of the AC power Pac2 from the magnitude of the DC power Pdc. As a result, it is possible to shorten the processing time. Further, the first controller 125 may also calculate the change amount of the parameter from the ripple amount using a predetermined calculation formula and the like without using the second characteristic table.

In a case where power consumption is small, the PFC is not required. In this case, charging is performed all at once near a peak of the rectified voltage illustrated in FIG. 15(*b*), whereby in the wireless power transfer system 101, in a case where the power control for reducing the ripple of the load current Iout is not performed, the waveform of the load current Iout becomes a saw-tooth wave. In this case, it is possible to reduce the ripple of the load current Iout by correcting the driving frequency f according to the change amount of the rectified voltage.

Further, in the wireless power transfer systems 101 and 101A, the second controller 135 may generate waveform information related to the waveform of the load voltage Vout, the load current Iout, or the load power Pout measured by the second detector 133. The first controller 125 may receive the waveform information from the second controller 135 through the second communication device 134 and the first communication device 124 and may control the first converter 122 so as to correct the AC power Pac2 based on the waveform information.

Specifically, the second controller 135 calculates the ripple amount of the load current Iout for each predetermined period from the measurement value of the load voltage Vout, the load current Iout, or the load power Pout measured by the second detector 133 and generates a combination of the phase or the timing and the ripple amount as the waveform information. The ripple amount in the waveform information is a value obtained by subtracting the current amount of the load current Iout from the desirable current amount. The predetermined period, for example, may be equal to or smaller than the above-described time Δt and is set to the second controller 135 in advance. The first controller 125 determines whether the ripple amount of the load current Iout is equal to or smaller than the allowed value based on the waveform information. The allowed value is determined in advance for the circuit of the wireless power transfer systems 101 and 101A and the load L, and it is a value having no influence on operation. In a case where it determines that an absolute value of the ripple amount included in the waveform information is larger than the allowed value, the first controller 125 adjusts the magnitude of the AC power Pac2 by adjusting the change amount of the parameter so as to decrease the absolute value of the ripple amount.

For example, in a case where the ripple amount included in the waveform information is a positive value, it indicates that a decrement of the load current Iout due to the zero crossing timing is not sufficiently complemented. For this reason, the first controller 125 increases the magnitude of the AC power Pac2 by adjusting the change amount of the parameter. Further, in a case where the ripple amount included in the waveform information is a negative value, it indicates that the load current Iout is increased exceeding the decrement of the load current Iout due to the zero crossing timing. For this reason, the first controller 125 decreases the magnitude of the AC power Pac2 by adjusting the change amount of the parameter.

In this way, the magnitude of the AC power Pac2 is corrected according to the waveform of the load voltage Vout, the load current Iout, or the load power Pout that is actual supplied to the load L. For this reason, it is possible to more surely reduce the ripple caused due to the zero crossing of the voltage Vac1 of the AC power Pac1.

REFERENCE SIGNS LIST

1, 101, 101A wireless power transfer system
2, 102, 102A power transmitter
3, 103 power receiver
21, 121 first coil (coil)
22, 122 first converter (converter)
23, 23A, 123 first detector
23i current sensor
23v voltage sensor
24, 124 first communication device
25, 125 first controller
26, 126 power converter
27, 127 DC/AC converter
28, 28A FB signal generator (feedback signal generator)
31, 131 second coil
32, 132 second converter
33, 133 second detector (detector)
34, 134 second communication device
35, 135 second controller
51 measurement value calculation unit
52 command value calculation unit
53 comparing unit
54 comparing unit
55 power correcting unit
61, 61A canceling waveform generating unit
62 combining unit
63, 63A waveform generating unit (first generating unit, second generating unit)
64 inverting unit
65 capacitor
66 selecting unit
Idc current
Iout load current
L load
Pac1 AC power (first AC power)
Pac2 AC power (second AC power)
Pac3 AC power
Pdc DC power
Pout load power
PS power source (AC power source)
Vac1 voltage
Vdc voltage
Vout load voltage

The invention claimed is:

1. A power transmitter for wirelessly supplying electric power to a power receiver, the power transmitter comprising:

a power converter configured to convert a first AC power supplied from an AC power source into a DC power;

a first detector configured to detect an electric current of the DC power;

a feedback signal generator configured to generate a feedback signal based on the electric current; and a controller configured to perform a feedback control on the electric power to be supplied to the power receiver based on the feedback signal, wherein the feedback signal generator generates a canceling waveform to reduce a ripple caused to the electric current due to zero crossing of a voltage of the first AC power and generates the feedback signal based on the electric current and the canceling waveform.

2. The power transmitter according to claim 1, wherein the feedback signal generator generates the canceling waveform by inverting the electric current.

3. The power transmitter according to claim 1, wherein the feedback signal generator generates the canceling waveform based on the first AC power.

4. The power transmitter according to claim 1, wherein the feedback signal generator includes:
a first generating unit configured to generate the canceling waveform by inverting the electric current;
a second generating unit configured to generate the canceling waveform based on the first AC power; and
a selecting unit configured to select and output either the canceling waveform generated by the first generating unit or the canceling waveform generated by the second generating unit.

5. The power transmitter according to claim 1, wherein the feedback signal generator corrects the canceling waveform based on a correction waveform corresponding to a ripple caused to a voltage of the DC power due to the zero crossing.

6. The power transmitter according to claim 1, the power transmitter further comprising:
a first communication device configured to receive ripple information related to a ripple of a load voltage, a load current, or a load power supplied to a load from the power receiver, wherein
the feedback signal generator corrects the canceling waveform based on the ripple information.

7. A wireless power transfer system comprising:
the power transmitter according to claim 6; and
the power receiver, wherein
the power receiver includes:
a second detector configured to detect the load voltage, the load current, or the load power;
a second controller configured to generate the ripple information based on the load voltage, the load current, or the load power measured by the second detector; and
a second communication device configured to transmit the ripple information to the power transmitter.

8. A power transmitter comprising:
a coil configured to wirelessly feed electric power to a power receiver;
a converter configured to convert a first AC power supplied from an AC power source into a second AC power and to supply the second AC power to the coil; and
a first controller configured to control the converter so as to change a magnitude of the second AC power based on a zero crossing timing of a voltage of the first AC power.

9. The power transmitter according to claim 8, wherein the converter includes a power converter configured to convert the first AC power into the DC power and a DC/AC converter configured to convert the DC power into the second AC power.

10. The power transmitter according to claim 9, wherein the first controller controls the converter so as to change the magnitude of the second AC power by changing a frequency of the second AC power.

11. The power transmitter according to claim 9, wherein the first controller controls the converter so as to change the magnitude of the second AC power by a phase shift control.

12. The power transmitter according to claim 8, wherein the first controller detects the zero crossing timing based on a voltage value of the voltage of the first AC power.

13. The power transmitter according to claim 9, wherein the first controller detects the zero crossing timing based on output from the power converter.

14. A wireless power transfer system comprising:
the power transmitter according to claim 8; and
the power receiver, wherein
the power receiver includes:
a detector configured to measure a load voltage, a load current, or a load power supplied to a load; and
a second controller configured to generate waveform information related to a waveform of the load voltage, the load current, or the load power measured by the detector, wherein,
the first controller controls the converter so as to correct a magnitude of the second AC power based on the waveform information.

* * * * *